United States Patent
Mikami

(10) Patent No.: US 7,415,629 B2
(45) Date of Patent: *Aug. 19, 2008

(54) METHOD FOR MANAGING PAIR STATES IN A STORAGE SYSTEM

(75) Inventor: Shogo Mikami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/714,744

(22) Filed: Mar. 7, 2007

(65) Prior Publication Data

US 2007/0162717 A1    Jul. 12, 2007

Related U.S. Application Data

(63) Continuation of application No. 11/033,402, filed on Jan. 12, 2005, now Pat. No. 7,206,912.

(30) Foreign Application Priority Data

Nov. 8, 2004    (JP)    ............... 2004-323902

(51) Int. Cl.
  *G06F 12/16*    (2006.01)
(52) U.S. Cl. ............... 714/6; 714/5; 711/162; 709/201
(58) Field of Classification Search ........... None
  See application file for complete search history.

(56) References Cited

U.S. PATENT DOCUMENTS

| | | | |
|---|---|---|---|
| 5,537,551 A | 7/1996 | Denenberg et al. | |
| 5,574,856 A | 11/1996 | Morgan et al. | |
| 5,765,173 A | 6/1998 | Cane et al. | |
| 5,860,122 A | 1/1999 | Owada et al. | |
| 6,480,500 B1 | 11/2002 | Erimli et al. | |
| 6,728,849 B2 | 4/2004 | Kodama | |
| 6,754,792 B2 | 6/2004 | Nakamura et al. | |
| 2003/0018851 A1 | 1/2003 | Ikeuchi et al. | |
| 2003/0046602 A1 | 3/2003 | Hino et al. | |
| 2003/0061549 A1 | 3/2003 | Nakayama et al. | |
| 2003/0191992 A1 | 10/2003 | Kaminsky et al. | |

(Continued)

FOREIGN PATENT DOCUMENTS

EP    1237088    9/2002

(Continued)

OTHER PUBLICATIONS

"Veritas Volume Manager Administrator's Reference Guide", Release 3.0.1, Solaris, May 1999, pp. 1-38.

*Primary Examiner*—B. James Peikari
(74) *Attorney, Agent, or Firm*—Mattingly, Stanger, Malur & Brundidge, P.C.

(57) ABSTRACT

A storage system includes an application server that provides an application composed of a plurality of programs, a plurality of first volumes that store data that the programs use, and a plurality of second volumes set in pair states where replicas of the plurality of first volumes are stored. A program for managing the storage system controls a computer to execute the procedures of: identifying any one of the plurality of programs; identifying a first volume that the identified program uses; obtaining every second volume set in a pair state with the first volume; and summarizing the first volume and the obtained second volume for the identified program.

2 Claims, 18 Drawing Sheets

U.S. PATENT DOCUMENTS

| | | |
|---|---|---|
| 2004/0039888 A1 | 2/2004 | Lecrone et al. |
| 2004/0133752 A1 | 7/2004 | Suzuki et al. |
| 2004/0260899 A1 | 12/2004 | Kern et al. |
| 2005/0050392 A1 | 3/2005 | Baba et al. |
| 2005/0086350 A1 | 4/2005 | Mai |

FOREIGN PATENT DOCUMENTS

| | | |
|---|---|---|
| EP | 1296244 | 3/2003 |
| EP | 1398702 | 3/2004 |
| EP | 1596303 | 11/2005 |
| JP | 2004-133897 | 4/2003 |

(*1) INFORMATION OF RCU TARGET PORT NUMBER IS NOT USED IN A SERIES OF PROCESSING, SO THE RCU TARGET PORT NUMBER IS NOT ILLUSTRATED, ALTHOUGH EACH PORT NUMBER EXISTS IN ACTUAL SYSTEM

APPLICATION CONFIGURATION INFORMATION TABLE

550

| APPLICATION NAME | PROGRAM NAME | VOLUME ID | SHARE APPLICATION NAME | PAIR STATE IN WHICH E-MAIL SHOULD BE ISSUED | E-MAIL DESTINATION | SERVER NAME |
|---|---|---|---|---|---|---|
| APP1 | APP1-1.exe | 001 | APP3 | ERROR | aaa@x.co.jp | SERVER2 |
| APP1 | APP1-2.exe | 020 | APP3 | WARN | bbb@x.co.jp | SERVER2 |
| APP2 | APP2-1.exe | 010 | NONE | NONE | NONE | SERVER3 |
| APP3 | APP3-1.exe | 001 | APP1 | ERROR | ccc@x.co.jp | SERVER4 |
| : | : | : | : | : | : | : |

CONFIGURATION INFORMATION AND OPERATION INFORMATION TABLE

| PRIMARY VOLUME ID/SUBSYSTEM ID | SECONDARY VOLUME ID/SUBSYSTEM ID | HOST-SIDE PORT ID | REMOTE-SIDE PORT ID | CONNECTION STATE | I/O FREQUENCY (NUMBER OF I/O BYTES/SEC) | THROUGHPUT (kB/sec) | SIDE FILE USAGE RATIO (%) | CASCADE CONNECTION |
|---|---|---|---|---|---|---|---|---|
| 001/10000 | 002/10001 | CL1-A | CL1-D | COPY | 20 | 20 | 80% | YES |
| 002/10001 | 003/10002 | CL1-B | CL1-E | ERROR | 0 | 0 | 30% | YES |
| 003/10002 | 004/10002 | CL2-B | NONE | COPY | 0 | 20 | 20% | NO |
| 020/10002 | 021/10002 | CL1-A | CL1-C | SMPL | 20 | 0 | 25% | NO |
| 010/10000 | 011/10001 | CL1-A | CL1-C | WARN | 80 | 30 | 60% | YES |
| 011/10001 | 012/10002 | CL2-B | CL1-E | PAIR | 20 | 20 | 10% | NO |
| .. | .. | .. | .. | .. | .. | .. | .. | .. |

FIG. 5

PAIR STATE DISPLAY TABLE

INFLUENCE RANGE DISPLAY TABLE (IN THE CASE OF EXCESSIVE I/O)

| PRIMARY VOLUME ID/SUBSYSTEM ID | SECONDARY VOLUME ID/SUBSYSTEM ID | RELATED APPLICATION NAME | HOST-SIDE PORT ID | I/O FREQUENCY (NUMBER OF I/O BYTES/sec) | THROUGHPUT (kB/sec) | SIDE FILE USAGE RATIO (%) | DATA CONSISTENCY (PRIMARY) | DATA CONSISTENCY (SECONDARY) |
|---|---|---|---|---|---|---|---|---|
| 001/10000 | 002/10001 | APP1,APP3 | CL1-A | 20 | 20 | 80% | NO PROBLEM | NO PROBLEM |
| 004/10002 | 005/10003 | APP1 | CL1-A | 20 | 0 | 25% | NO PROBLEM | NO PROBLEM |
| 010/10000 | 011/10001 | APP2 | CL1-A | 80 | 30 | 60% | NO PROBLEM | NO PROBLEM |
| ... | ... | ... | ... | ... | ... | ... | ... | ... |

FIG. 7

INFLUENCE RANGE DISPLAY TABLE (IN THE CASE OF CABLE WIRE SNAPPING)

| PRIMARY VOLUME ID/SUBSYSTEM ID | SECONDARY VOLUME ID/SUBSYSTEM ID | RELATED APPLICATION NAME | HOST-SIDE PORT ID | I/O FREQUENCY (NUMBER OF I/O BYTES/sec) | THROUGHPUT (kB/sec) | SIDE FILE USAGE RATIO (%) | DATA CONSISTENCY (PRIMARY) | DATA CONSISTENCY (SECONDARY) |
|---|---|---|---|---|---|---|---|---|
| 002/10001 | 003/10002 | APP1,APP3 | CL1-E | 0 | 0 | 30% | NO PROBLEM | NO PROBLEM |
| 003/10002 | 004/10002 | APP1,APP3 | NONE | 0 | 20 | 20% | ANY PROBLEM | ANY PROBLEM |
| 011/10001 | 012/10002 | APP2 | CL1-E | 20 | 20 | 10% | NO PROBLEM | NO PROBLEM |
| ... | ... | ... | ... | ... | ... | ... | ... | ... |

FIG. 8

METHOD FOR MANAGING PAIR STATES IN A STORAGE SYSTEM

CROSS-REFERENCE TO PRIOR APPLICATION

This is a continuation application of U.S. Ser. No. 11/033,402, filed Jan. 12, 2005 (now U.S. Pat. No. 7,206,912).

This application relates to and claims priority from Japanese Patent Application No. 2004-323902, filed on Nov. 8, 2004 the entire disclosure of which is incorporated herein by reference.

BACKGROUND

This invention relates to a storage system that replicates application data between plural volumes.

In the field of SANs (Storage Area Networks) or NASs (Network Attached Storages) where integrated storages are accessed from plural servers through networks, current systems tend to be large-scaled and highly-functional.

As an example of a highly-functional system, a technique is known in which data of applications running on servers is replicated (copied) to remote places, or the like, using a remote copy function possessed by the storages, while continuing other tasks, thereby enhancing redundancy.

Also, in such a SAN or NAS, plural servers utilize plural storages, so there is a tendency that a storage system including the storages and the associated network will be large-scaled and complicated. In order to make efficient use of the storages, a technique, as disclosed, for example, in JP 2004-133897 A, is known in which a fault that occurs to the storages or the network for connecting the storages and the servers to each other is detected without delay.

In this conventional example, an event message from a device constituting the storage system is obtained, and a management console is informed of the fault according to the importance of the event message.

In the conventional example described above, however, there is a problem in that, although it is possible to identify the location at which the fault has occurred (i.e., the device to which the fault has occurred), it is impossible to know how replication carried out by the remote copy function has been influenced by the fault.

In other words, from the storage perspective, it is sufficient that an administrator administering the storage system (hereinafter referred to as the "storage administrator") identifies in which device the fault has occurred and is able to make repairs to the device. On the other hand, an administrator administering tasks (applications) on the servers (hereinafter referred to as the "application administrator") is required to grasp how the replication performed in units of the applications has been influenced by the fault that occurred in the storage system, and how to maintain the consistency of data.

However, when a fault relating to replication has occurred in a large-scaled storage system, even when the application administrator knows the location of the fault, it is extremely difficult for him/her to check how the fault affected replication relations of a volume of a storage that a specific application uses, and how each volume that is a replication destination of the volume has been influenced. Also, in an environment in which replication is performed for plural applications, there can occur a case where the same volume is used by two or more applications. In such a case, it can be extremely difficult for the application administrator to grasp the range of influence resulting from the fault that occurred in the storage system with respect to the replication relations.

SUMMARY

It is therefore an object of this invention to allow an application administrator to grasp with ease and without delay the effects of a fault that occurs concerning replication performed in units of applications.

To achieve the above-mentioned objects, this invention provides a method of managing a storage system including an application server that provides an application composed of a plurality of programs, a plurality of first volumes that store data that the programs use, and a plurality of second volumes set in pair states where replicas of the plurality of first volumes are stored. The method includes: identifying any one of the plurality of programs; identifying a first volume that the identified program uses; obtaining every second volume set in a pair state with the first volume; and summarizing the first volume and the second volume for the identified program.

According to an aspect of this invention, operation information of the first volume and the second volume is collected, one of a fault and a faulty state of the pair state is detected as a connection state based on the operation information, and the first volume and the second volume set in the pair state and the connection state for an identified program are summarized.

Accordingly, with this invention, it becomes possible for the application administrator to monitor a volume that a specific program uses and the pair state (replication relation) of every volume set in a pair state from this volume, and to monitor whether a problem has occurred to replication of data.

Also, it becomes possible for the application administrator to confirm whether an abnormality has occurred to data of an application that he/she manages and a pair state at a replication destination thereof by glancing at summarized information, which allows the application administrator to grasp a fault concerning replication performed in units of applications with ease and without delay.

BRIEF DESCRIPTION OF THE DRAWINGS

FIG. 4 is an explanatory diagram showing an example of an application configuration information table.

FIG. 5 is an explanatory diagram showing an example of a configuration information and operation information table of a management server.

FIG. 7 is an explanatory diagram showing an example of an influence range display table in the case of excessive I/O.

FIG. 8 is an explanatory diagram showing an example of an influence range display table in the case of a wire snapping.

DETAILED DESCRIPTION OF THE PREFERRED EMBODIMENTS

Hereinafter, an embodiment of this invention will be described with reference to the accompanying drawings.

Figure 1:
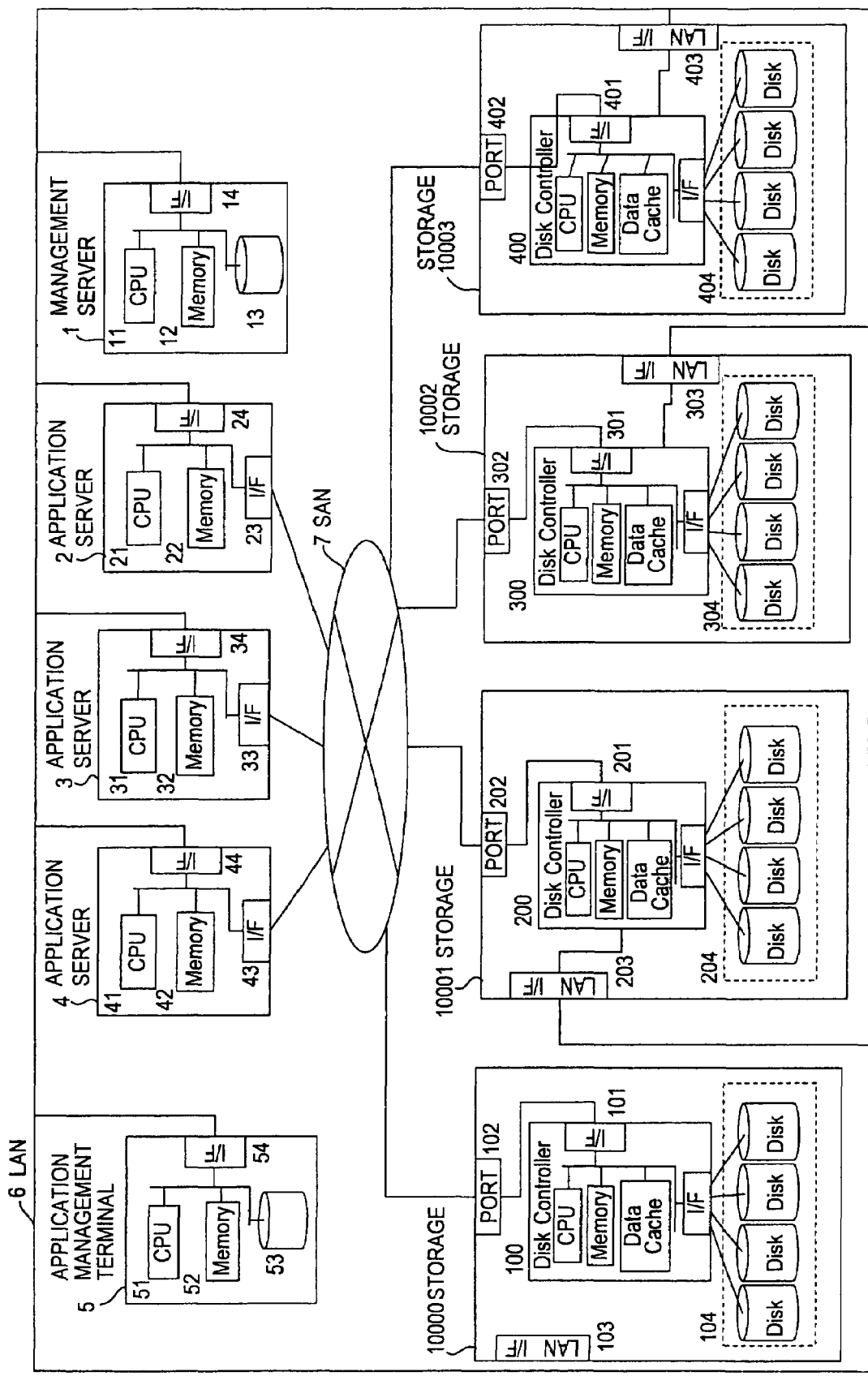
FIG. 1 is an example of a block diagram showing an overall configuration of a system.

FIG. 1 is a configuration diagram of a system to which this invention has been applied. Connected to a LAN (Local Area Network) 6 are application servers 2 to 4 that execute application programs, a management server 1 that manages storages and a SAN (Storage Area Network) 7, an application management terminal 5 that manages the application programs of the application servers 2 to 4, and storage systems (storage subsystems) 10000 to 10003. It should be noted that the LAN 6 is, for instance, formed by a TCP/IP network or the like. Also, the SAN 7 is, for instance, formed by FCs (Fibre Channels), with FC switches (not shown) and the like constituting the SAN 7 being also connected to the LAN 6.

The application servers 2 to 4 are connected to the storage systems 10000 to 10003 through the SAN 7 and perform reading/writing of data and the like. The management server 1 makes settings of the storage systems 10000 to 10003 and the FC switches and performs collection of operation information (performance information) through the LAN 6. As will be described later, the application management terminal 5 inquires of the application servers 2 to 4 and the management server 1 about a replication relation as to an application designated by an application administrator or the like who administers the application servers 2 to 4, obtains information containing consistency of the replication relation and the like from the management server 1, and informs the application administrator of the information.

In the system configuration in FIG. 1, the management server 1 includes a CPU 11, a memory 12, a LAN interface (I/F) 14, and a disk device 13. Also, the management server 1 is connected to the LAN 6 through the LAN interface 14. A control program (to be described later) has been loaded into the memory 12 and the CPU 11 reads and executes the control program. Through this execution, various processing (to be described later) is performed.

The application server 2 includes a CPU 21, a memory 22, a SAN interface 23 connected to the SAN 7, and a LAN interface 24. The application server 2 accesses the storage systems 10000 to 10003 on the SAN 7 through the SAN interface 23 and performs reading/writing of data. An application program to be described later has been loaded into the memory 22 of the application server 2 and the CPU 21 reads and executes the application program. Through this execution, a task is provided to a client (not shown) on the LAN 6.

It should be noted that the application servers 3 and 4 are also configured in the same manner as the application server 2 described above. Thus, application server 3 includes a CPU 31, a memory 32, a SAN interface 33 connected to the SAN 7, and a LAN interface 34, and application server 4 includes a CPU 41, a memory 42, a SAN interface 43 connected to the SAN 7, and a LAN interface 44. With this configuration, the application servers 3 and 4 execute predetermined application programs, perform data access to the storage systems 10000 to 10003 through the SAN 7, and provide tasks to the client (not shown) on the LAN 6.

Meanwhile, the storage system (storage subsystem) 10000 includes a disk device 104 and a disk controller 100 that controls the disk device 104.

In FIG. 1, the disk controller 100 of the storage system 10000 includes a CPU, a memory, a cache, and a SAN interface 101 connected to a port 102. Also, the disk controller 100 is connected to a LAN interface 103. Further, the disk controller 100 is connected to the disk device 104 and accesses volumes set in the disk device 104 through the disk interface. It should be noted that the disk device 104 includes plural disks.

The port 102 is connected to the SAN 7 and exchanges data with the application servers 2 to 4. Also, the port 102 is connected to the LAN 6 through the LAN interface 103 and performs a setting of the volumes (storage volumes) of the disk device 104, collection of operation information, and the like according to commands from the management server 1. It should be noted that as will be described later, the port 102 includes a host-side port for performing communication with the application servers 2 to 4 and a remote-side port for performing communication with the storage that is a replication destination.

A control program has been loaded into the memory of the disk controller 100 and the CPU 101 reads and executes the control program. Through this execution, volume setting processing, remote copy (shadow image, universal replication, true copy) between volumes or between storages, processing for obtaining operation information of each volume or each port, and the like are performed according to commands from the management server 1. It should be noted that the universal replication refers to remote copy based on transfer of journal files (history information of writing data from the application servers 2 to 4).

The storage systems 10001 to 10003 are also configured in the same manner as the storage system 10000 described above. Thus, storage system 10001 includes a disk controller 200, a SAN interface 201 connected to a port 202, a LAN interface 203, and a disk device 204; storage system 10002 includes a disk controller 300, a SAN interface 301 connected to a port 302, a LAN interface 303, and a disk device 304; and storage system 10003 includes a disk controller 400, a SAN interface 401 connected to a port 402, a LAN interface 403, and a disk device 404. With this configuration, the storage systems 10001 to 10003 execute predetermined control programs and access volumes provided on disk devices 204, 304, and 404 according to requests received from the application servers 2 to 4 through the SAN 7.

Also, as will be described later, replication relations are set among the volumes of the disk devices of the storage systems 10000 to 10003.

Software Configuration

Next, with reference to FIG. 2, a software configuration of this embodiment will be described.

The application programs on the application servers 2 to 4 store data in predetermined volumes of the storages. Also, as will be described later, pair volumes for creating replicas are set for the volumes. In this embodiment, relations between volumes (hereinafter referred to as the "primary volumes"), with respect to which the application servers 2 to 4 perform reading/writing, and volumes (hereinafter referred to as the "secondary volumes"), in which the contents of the primary volumes are written and replicas are created, are referred to as the "pair states" (or the "pair volumes"). In addition, a case where a replica of a primary volume is created by writing the contents of its corresponding secondary volume into another volume is also included in the pair states. Also, the pair states are applicable to between volumes in the same storage as well as between volumes of different storage systems and a case where replication chaining (pair state cascading) is performed between different storage systems is also contained in the pair states.

In this embodiment, the pair states between the volumes viewed from the application programs on the application servers 2 to 4 are monitored, and when it is detected that an abnormality has occurred to a pair state, the application administrator is informed of the abnormality.

First, in the management server 1, a storage management program 15 is running that manages the storage systems 10000 to 10003 connected to the SAN 7. This storage management program 15 monitors the pair states between the volumes and operation states in units of applications, detects an abnormality, and informs the application management terminal 5 of a result of the monitoring.

To do so, the storage management program 15 collects configuration information (volume configuration and path configuration, for instance) of the storage systems 10000 to 10003 from the disk controllers 100 to 400 in predetermined cycles or the like, collects operation information (I/O frequency, throughput, and side file usage ratio of each volume, for instance) of the storage systems 10000 to 10003 from the disk controllers 100 to 400 in predetermined cycles or the like, and updates a configuration information and operation information table 16. It should be noted that the storage management program 15 may have a function of setting and changing the volume configurations and the like of the storage systems 10000 to 10003 in addition to the functions described above. It should be noted that in the operation information described above, the I/O frequency is indicated by the number of I/O bytes per second or the like and the throughput is a value expressed by the data transfer speed (kilobytes per second) of each volume or the like. Also, the side file usage ratio shows a ratio of the data cache of the disk controller used for copy of each pair state. When the side file usage ratio is low, this indicates that data writing is performed smoothly at the time of copy. On the other hand, when the side file usage ratio is high, this indicates a case where the throughput of a port used for data writing has been lowered, for instance.

The disk controllers 100 to 400 of the storage systems 10000 to 10003 monitored by the management server 1 includes configuration information management units 110 to 410 that manage the volume configurations and the like of the storages and operation information management units 120 to 420 that manage the operation information of the volumes. Also, the management server 1 inquires of the disk controllers 100 to 400 of the storage systems 10000 to 10003, respectively, about the configuration information and the operation information in predetermined cycles or the like and collects the information. It should be noted that the disk controllers 100 to 400 of the storage systems 10000 to 10003, respectively, may voluntarily inform the management server 1 of the configuration information and the operation information in predetermined cycles.

Next, in each of the application servers 2 to 4, application programs are running. For instance, an application APP1 is executed in the application server 2, an application APP2 is executed in the application server 3, and an application APP3 is executed in the application server 4. In general, there is a case where an application is composed of plural programs. In this example, a case is shown in which the application APP1 of the application server 2 is composed of an application program APP1-1.exe and an application program APP1-2.exe and the applications APP2 and APP3 of the application servers 3 and 4 are respectively composed of a single application program APP2-1.exe and a single application program APP3-1.exe.

In addition, in the application servers 2 to 4, application management programs 25, 35, and 45 that manage the applications APP1 to APP3 are running as monitoring agents of the application servers 2, 3, and 4, respectively.

The application management programs 25 to 45 manage a list of programs of the applications, a list of volumes of the storage systems 10000 to 10003 that the programs use, and information showing whether the volumes are shared by other programs of the same application and/or programs of other applications as configuration information tables 26, 36, and 46 in the application servers 2, 3, and 4, respectively.

The application programs 25 to 45 inform the management server 1 of information in the configuration information tables 26, 36, and 46 according to commands from the application management terminal 5.

In the application management terminal 5, a monitoring program 55 for monitoring the pair states in units of the applications of the application servers 2 to 4 is running. This monitoring program 55 has a list (application configuration information table 550—see FIG. 4) of the application programs of the applications executed at the application servers 2 to 4 and, when the application administrator designates an application name, extracts application programs corresponding to the designated application name from the application table. Then, the monitoring program 55 commands the application management programs of the application servers 2 to 4 that execute the application programs to inform the management server 1 of the configuration information of the application programs.

Then, the storage management program 15 of the management server 1 returns a result of reference as to the pair states to the monitoring program 55 of the application management terminal 5 in units of application names. The monitoring program 55 displays the monitoring result received from the storage management program 15 on a display equipment (not shown) of the application management terminal 5 or the like.

Volume Configuration

Next, with reference to FIG. 3, an example of the configurations and pair states of the volumes set in the storage systems 10000 to 10003 will be described.

Figure 3:
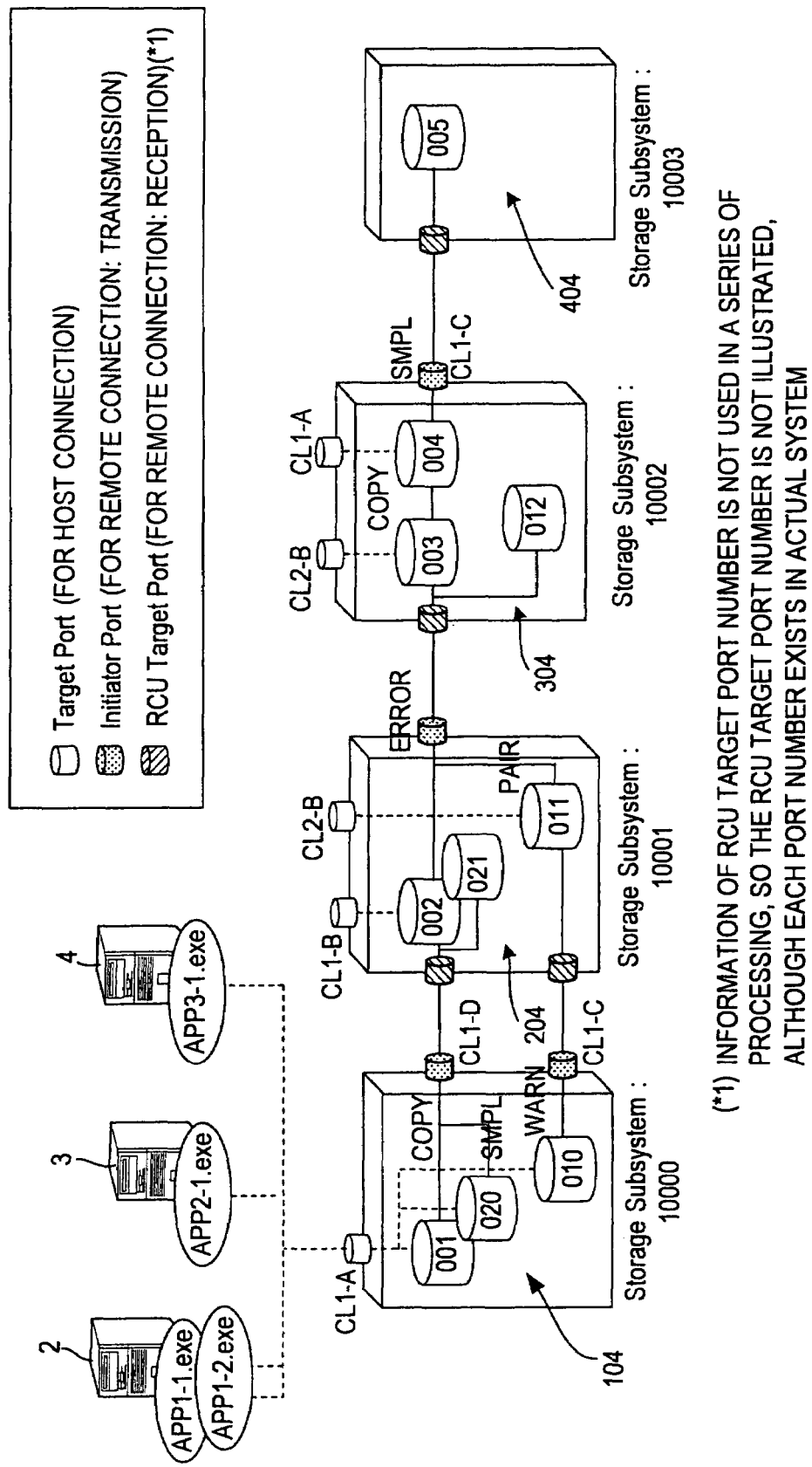
FIG. 3 is an example of a block diagram showing a volume configuration and a port configuration of the storage system.

In FIG. 3, volumes 001, 010, and 020 are set in the disk device 104 of the storage system 10000. In a like manner, volumes 002, 011, and 021 are set in the disk device 204 of the storage system 10001, volumes 003, 004, and 012 are set in the disk device 304 of the storage system 10002, and a volume 005 is set in the disk device 404 of the storage system 10003.

Also, a port CL1-A is provided for the storage system 10000 as a host-side port, is connected to the volumes 001, 010, and 020, and performs communication with the application servers 2 to 4. In addition, a port CL1-D is provided as a remote-side port through which the volumes 001 and 020 are connected to the storage system 10001.

Ports CL1-B and CL2-B are provided for the storage system 10001 as host-side ports, are respectively connected to the volume 002 and the volume 011, and perform communication with the application servers 2 to 4. In addition, a port CL1-E is provided as a remote-side port through which the volumes 002 and 011 are connected to the storage system 10002.

Here, a pair state is set in which the volume 001 of the storage system 10000 is set as a primary volume (primary), the volume 002 of the storage system 10001 is set as a secondary volume (secondary), and a replica of the volume 001 is created in the volume 002. It should be noted that this pair state is set by the management server 1 in advance (the same applies to the following description).

In a like manner, the volume 010 of the storage system 10000 and the volume 011 of the storage system 10001 are set in a pair state (copy relation) and the volume 020 of the storage system 10000 is set in a pair state with the volume 021 of the storage system 10001. Here, the volume 021 does not have a host-side port, so the pair state between the volumes 020 and 021 becomes Simplex (denoted as "SMPL" in the drawing).

Then, ports CL2-B and CL1-A are provided for the storage system 10002 as host-side ports, are respectively connected to the volume 003 and the volume 004, and perform communication with the application servers 2 to 4. In addition, a port for remote connection is provided through which the volume 012 is connected to the storage system 10001.

Here, the volumes 003 and 004 of the storage system 10002 are set in a pair state (local copy) where the volume 003 is the primary volume thereof.

Also, pair state cascading is set in which the volume 002 of the storage system 10001 is set as the primary volume (primary) of a pair state, the volume 003 of the storage system 10002 is set as the secondary volume (secondary) of the pair state, a replica of the volume 002 is created in the volume 003, and a replica of the volume 003 is further created in the volume 004.

Also, the volume 011 of the storage system 10001 and the volume 012 of the storage system 10002 are set in a pair state.

Finally, the volume 005 of the storage system 10003 is connected to the storage system 10002 through a port for remote connection and the volume 004 and the volume 005 are set in a pair state.

In other words, data in the volume 001 is replicated to the volumes 002, 003, 004, and 005 through the cascading of the pair states of the volumes. Also, the volume 020 is set in a simple pair state where a replica of data therein is created only in the volume 021. Further, data in the volume 010 is replicated to the volumes 011 and 012 in succession through a cascading pair state.

Next, with reference to FIG. 4, relations between the application servers 2 to 4 and the volumes of the storage systems 10000 to 10003 will be described. FIG. 4 shows an example of the application configuration information table 550, which is described further below. It should be noted that this application configuration information table 550 is set in advance by the application administrator or the like from the application management terminal 5.

In this example, the program APP1-1.exe of the application APP1 and the program APP3-1.exe of the application APP3 use the volume 001 of the storage system 10000, the program APP1-2.exe of the application APP1 uses the volume 020 of the storage system 10000, and the program APP2-1.exe of the application APP2 uses the volume 010 of the storage system 10000.

Outline

Next, the outline of processing that is performed by the monitoring program 55 of the application management terminal 5, the application management programs 25 to 45 of the application servers 2 to 4, and the management server 1, and monitoring of the pair states of the volumes viewed from the applications will be described.

Figure 2:
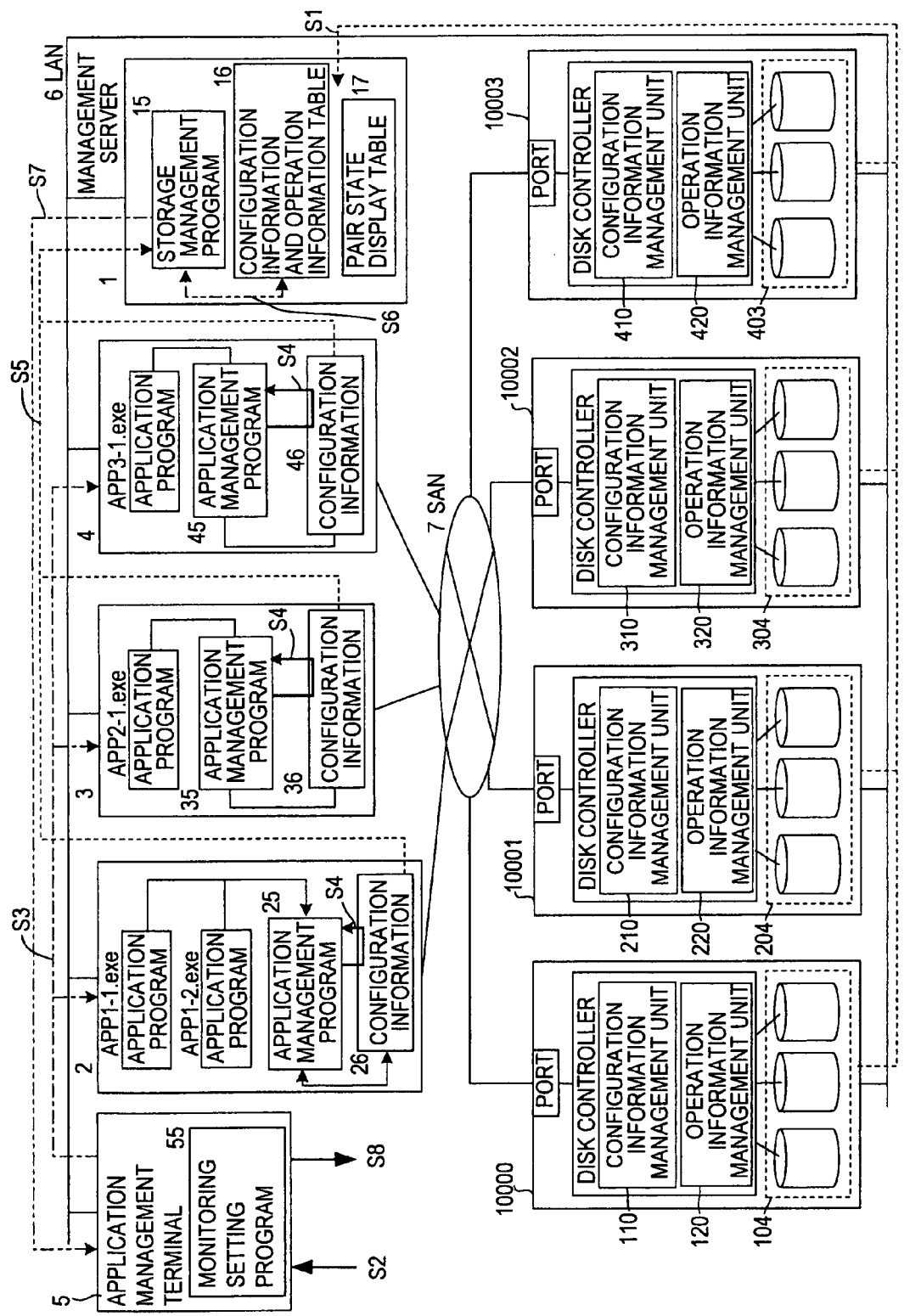
FIG. 2 is an example of a block diagram showing a software configuration.

First, as indicated by an arrow S1 in FIG. 2, the management server 1 collects the configuration information and the operation information from the disk controllers of the storage systems 10000 to 10003 in advance or periodically, and stores the collected information in the configuration information and operation information table 16 of the management server 1. The configuration information in the configuration information and operation information table 16 shows the chaining of the pair relations of the volumes (configuration of the cascading), the relations of the allocated ports, and the like. Also, the operation information in the configuration information and operation information table 16 shows the pair states, the directions of copy, the I/O frequencies, the side file usage ratios, the throughputs between the ports, and the like.

FIG. 5 shows an example of this configuration information and operation information table 16. In FIG. 5, the configuration information and operation information table 16 is composed of a primary column 1611 that stores the identifiers of the primary volumes and the identifiers of the storages (storage subsystems) having the primary volumes, a secondary column 1612 that stores the identifiers of the secondary volumes and the identifiers of the storages having the secondary volumes, a host-side port ID column 1613 that stores the identifiers of the host-side ports of the volumes given in the primary column 1611, and a remote-side port ID column 1614 that stores the identifiers of the remote-side ports of the volumes given in the primary column 1611.

Also, the configuration information and operation information table 16 includes a connection state column 1615 that stores the connection states between the primary volumes in the primary column 1611 and the secondary volumes in the secondary column 1612. For instance, the connection states are each set to one of "COPY" indicating a state where replication (shadow image) is normal, "ERROR" indicating a case where a problem (fault) has occurred to replication, "SMPL" indicating a state where Simplex described above is normal, "WARN" indicating a case where there is a danger that a problem (fault) would occur to replication, and "PAIR" indicating a state where replication (universal replication) is normal.

Further, the configuration information and operation information table 16 includes an I/O frequency column 1616 that shows the I/O transfer amounts per unit time of the host-side ports of the primary volumes, a throughput column 1617 that shows data transfer speeds per unit time between the primary volumes and the secondary volumes, and a side file usage ratio column 1618 that shows the usage ratios of the caches used for replication of the pair states. It should be noted that the I/O frequency column 1616 and the throughput column 1617 may store operation information of the host-side ports as well as the remote-side ports.

Next, as indicated by an arrow S2 in FIG. 2, the application administrator inputs the name of an application that is a monitoring target from the application terminal 5. Here, a task name or an application program name may be inputted instead.

In the application management terminal 5, the application configuration information table 550 is set in advance. This application configuration information table 550 is composed of an application name column 551 that stores the names of the applications, a program name column 552 that stores the identifiers of programs of the applications whose names are given in the application name column 551, a volume ID column 553 that stores the identifiers of the volumes of the storages that are used by the programs whose IDs are given in the program name column 552, a shared application name column 554 that stores the names of other applications that also use the volumes whose IDs are given in the volume ID column 553, an informing level column 555 that stores levels at which notifications (warnings) should be issued by e-mail for the states of volumes in pair states with the volumes whose IDs are given in the volume ID column 553, a destination column 556 that stores e-mail addresses to which the notifications should be sent, and a server name column 557 that gives the identifiers of the application servers that execute the applications whose names are given in the application name column 551.

When the input described above is the input of an application program name, as indicated by an arrow S3 in FIG. 2, the monitoring program 55 refers to the application configuration information table 550 shown in FIG. 4 and instructs the application management program of the application server corresponding to the inputted program name to monitor a program having the inputted program name. Also, when the input described above is the input of an application name, the monitoring program 55 refers to the application configuration information table 550, extracts each program name corresponding to the inputted application name from the program name column 552, and instructs the application management program of the application server that executes each program having the extracted program name to monitor the program.

As indicated by an arrow S4 in FIG. 2, in the application server, the application management program refers to the configuration information table using the application name or program name inputted from the application management terminal 5 as a key and obtains information of each volume and the like corresponding to the application name or program name.

Here, each of the configuration information tables 26 to 46 is a table composed of the application name column 551, the program name column 552, the volume ID column 553, and the share application name column 554 among the columns of the application configuration information table 550 shown in FIG. 4 described above, and gives information of the application executed in the application server having the configuration information table.

Then, as indicated by an arrow S5 in FIG. 2, the application management programs 25 to 45 sends, to the management server 1, information of the application, in other words, a list of volumes that programs of the application uses and information showing whether the volumes are shared by other programs of the application or programs of other applications.

Following this, as indicated by an arrow S6 in FIG. 2, the storage management program 15 of the management server 1 refers to the configuration information and operation information table 16 using the volume list received from the application server as a key and reads the pair state (pair volume) configuration information and operation state of each volume on the volume list from the configuration information and operation information table 16.

Figure 6:
FIG. 6 is an explanatory diagram showing an example of a pair state display table containing summarized connection states.

Then, as indicated by an arrow S7 in FIG. 2, the management server 1 summarizes the pair states of the volumes in units of program names using the read pair state configuration information and operation information, in other words, using a list of programs corresponding to the designated application name, a list of volumes that the programs use, information showing whether the volumes are shared by other programs of the same application or programs of other applications, the pair information of each volume on the volume list, the configuration information of cascaded volumes, and the operation states of the cascaded volumes, generates a pair state display table 17 shown in FIG. 6 that shows the summarized connection states of the pair states, and sends the generated pair state display table 17 to the application management terminal 5. It should be noted that FIG. 6 relates to a case where APP1 was inputted as the application name at the application management terminal 5.

The pair state display table 17 shown in FIG. 6 is composed of an application name column 561 that stores the names of applications, a program name column 562 that stores the identifiers of programs constituting the applications whose names are given in the application name column 561, a pair name column 563 that stores the paired identifiers of volumes in pair states that the programs use, a connection state column 564 that stores the connection states of the pairs, and a connection state (summary) column 565 where the connection states of the pairs have been summarized in units of program names.

The connection state (summary) column 565 of this pair state display table 17 is a result of extraction of the worst connection state from among the connection states corresponding to each application name in the application name column 561. Here, for instance, "ERROR" indicates the worst state, "WARN" indicates the next worst state, and each value other than "ERROR" and "WARN" indicates a normal state. In the case of the program APP1-1.exe of the application APP1 in FIG. 6, for instance, the pair name "002-003" corresponds to the connection state "ERROR", so the monitoring program 55 regards this connection state as a representative pair state of the program APP1-1.exe and stores "ERROR" in the connection state (summary) column 565 for this program.

Then, as indicated by the arrow S7 in FIG. 2, the storage management program 15 of the management server 1 transmits information in the pair state display table 17 edited in the manner described above to the application management terminal 5. On receiving this information, as indicated by an arrow S8 in FIG. 2, the monitoring program 55 of the application management terminal 5 displays the pair state display table 17 on the display equipment (not shown) and informs the application administrator or the like of the pair states summarized in units of applications.

On receiving the pair state display table 17, the monitoring program 55 of the application management terminal 5 compares the connection states in the connection state column 564 of the pair state display table 17 with the informing levels in the informing level column 555 of the application configuration information table 550. When any connection state in the column 564 is worse than its corresponding informing level set in the informing level column 555, the monitoring program 55 transmits an e-mail containing a corresponding application name, pair state, and connection state to a predetermined e-mail destination column 556, thereby informing the application administrator of a warning or an abnormality.

In addition, when WARN or ERROR exists in the connection state column 564 of the pair state display table 17, the management server 1 identifies the range of an influence on application replication in the manner described below.

The replication relation influence range identifying is a function of, when an abnormality has occurred to a pair volume state relating to an application that is a monitoring target or an abnormality is likely to occur thereto, selectively displaying a range where the application administrator needs to take measures, and a range where the problem is considered to exert influences. When doing so, the storage management program 15 obtains operation information relating to the phenomenon that has occurred and narrows down the influence range according to the obtained operation information. Consequently, even when there have occurred phenomena that seem to be the same, the range of the narrowing down varies depending on circumstances at that time.

Hereinafter, two examples of the influence range identifying by the storage management program 15 will be described. It should be noted that the details of the processing for narrowing down the influence range will be described later.

1. Case of Excessive I/O

First, a case where an abnormality has occurred to a pair state due to excessive disk I/O of an application will be described.

When the "application APP2" is set as a monitoring target in the application management programs 25 to 45, at a point in time when the storage management program 15 detects that the pair state of the pair "010-011" becomes "WARN" in FIG. 5, the storage management program 15 starts additional information obtainment for performing the narrowing down of display information.

Figure 9:
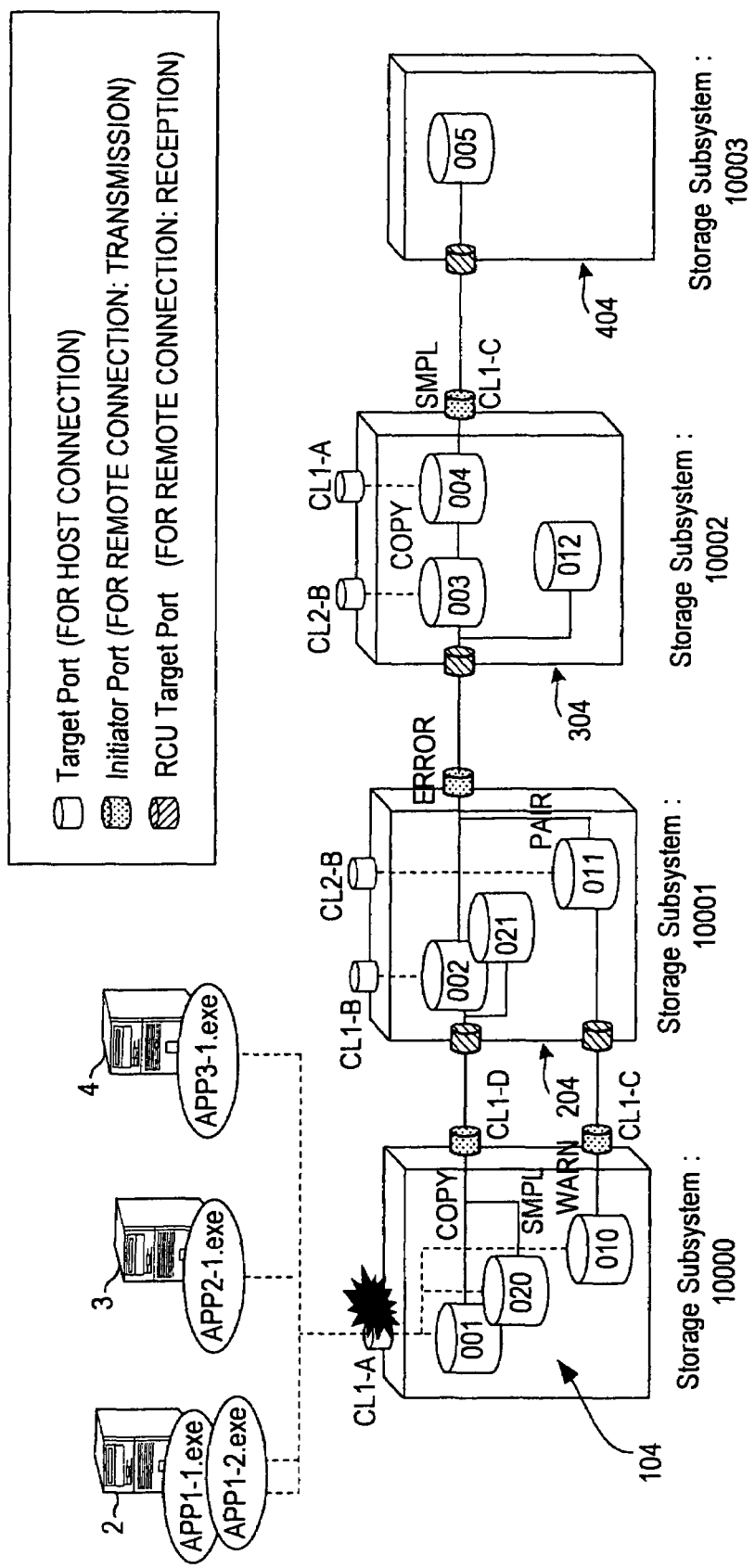
FIG. 9 is an example of a block diagram showing the volume configuration and the port configuration of the storage system in the case of the excessive I/O.

As a reason why the pair state becomes "WARN", broadly, a possibility that "any problem has occurred to connection for pair linkage" and a possibility that "a delay has occurred to copy processing (replication) due to excessive writing into the primary volume of a pair" are conceivable. Therefore, the storage management program 15 obtains statistical information of the I/O frequency in the I/O frequency column 1616 and the throughput in the throughput column 1617 in FIG. 5 described above, and checks whether a steep change has occurred to these values. In this example, when it is found from the statistical information that the I/O frequency has significantly increased recently, the storage management program 15 extracts the volumes 001 and 020 belonging to the port CL1-A that the volume 010 uses for host connection from the configuration information and operation information table 16 in FIG. 5, and judges that these volumes are appropriate as a "range in which it is required to take measures". In other words, a state shown in FIG. 9 has occurred in this example.

Then, necessary information is stored in an influence range display table (warning display table) 18 shown in FIG. 7, and information in this influence range display table 18 is sent to the application management terminal 5. The monitoring program 55 of the application management terminal 5 receives the influence range display table 18 and outputs it to the display equipment.

As shown in FIG. 7, the influence range display table 18 is composed of a primary column 1801 that stores the identifiers of primary volumes and the identifiers of storage systems (storage subsystems) having the volumes, a secondary column 1802 that stores the identifiers of secondary volumes and the identifiers of storages having the volumes, a related application name column 1803 that stores the names of applications that perform access to the volumes whose IDs are given in the primary column 1801, a host-side port ID column 1804 that stores the identifiers of the host-side ports of the volumes whose IDs are given in the primary column 1801, an I/O frequency column 1805 that stores the I/O frequencies of the host-side ports whose IDs are given in the host-side port ID column 1804, a throughput column 1806 that stores the throughputs of the host-side ports whose IDs are given in the host-side port ID column 1804, a side file usage ratio column 1807 that stores the usage ratios of caches used for replication of pair states, a data consistency (primary) column 1808 that stores the consistency of data on a primary side, and a data consistency (secondary) column 1809 that stores the consistency of data on a secondary side. It should be noted that in this example, the port IDs are used as route information between the primary volumes and a host (application server) side, although path information or the like may be used instead.

It is possible for the application administrator to prevent degradation of performance of applications from occurring by performing load distribution with respect to the volume "010" that is used by the application "APP2", and by changing the allocated port for host connection of the volumes relating to the applications "APP1" and "APP3" with reference to the influence range display table 18 displayed on the display equipment of the application management terminal 5. Also, in this case, no abnormality has occurred to replication itself in the pair "010-011", so application information concerning the pair "011-012" that is cascaded with this pair volume is not contained in the influence range display table 18.

2. Case of Wire Snapping

Next, a case where an abnormality has occurred to a pair state due to wire snapping of a fibre-channel cable constituting the SAN 7 will be described.

When "APP1" is set as a monitoring target in the application management program 25 to 45, at a point in time when the storage management program 15 detects that the pair state of "002-003" becomes "ERROR" in FIG. 5, the storage management program 15 starts additional information obtainment for performing the narrowing down of display information.

As a reason why the pair state becomes "ERROR", broadly, a possibility that "any problem has occurred to connection for pair linkage" and a possibility that "a delay has occurred to copy processing due to excessive writing into the primary volume of a pair" are conceivable.

Figure 10:
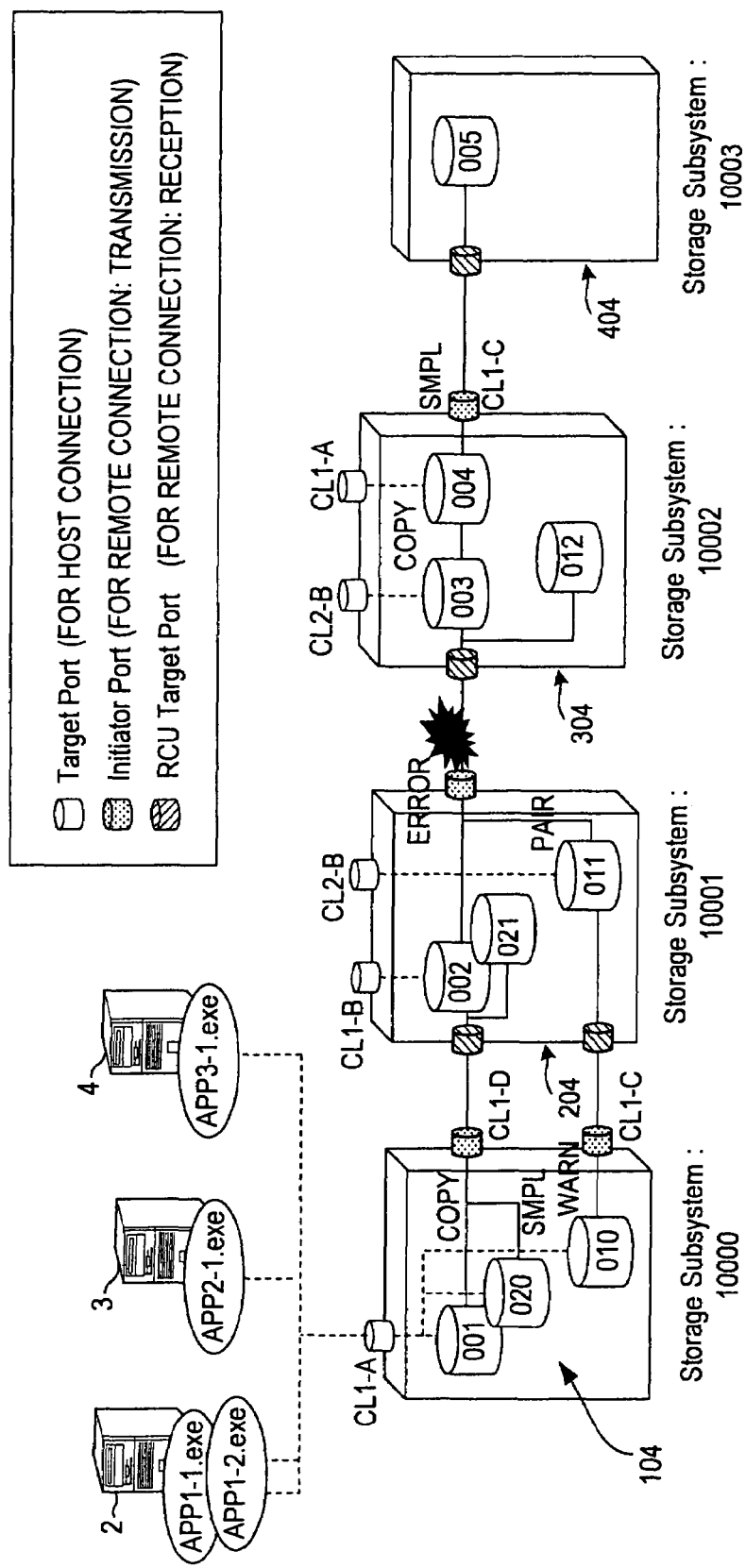
FIG. 10 is an example of a block diagram showing the volume configuration and the port configuration of the storage system in the case of the wire snapping.

Therefore, the storage management program 15 obtains statistical information of the I/O frequency in the I/O frequency column 1616 and the throughput in the throughput column 1617 of the configuration information and operation information table 16 in FIG. 5 and checks whether a steep change has occurred to these values. In this example, it is found from the statistical information that the throughput has become "0" from a certain point in time, so the storage management program 15 judges that the pair "011-012" belonging to the remote-side port "CL1-E" that the volume "002" uses for remote copy is appropriate as the "range in which it is required to take measures". In other words, a state shown in FIG. 10 has occurred in this example.

Then, necessary information is stored in an influence range display table 19 in FIG. 8 and then information in this influence range display table 19 is sent to the application management terminal 5. The monitoring program 55 of the application management terminal 5 receives the influence range display table 19 and outputs it onto the display equipment.

As shown in FIG. 8, the influence range display table 19 is composed of a primary column 1901 that stores the identifiers of primary volumes and the identifiers of storages (storage subsystems) having the volumes, a secondary column 1902 that stores the identifiers of secondary volumes and the identifiers of storages having the volumes, a related application name column 1903 that stores the names of applications that perform access to the volumes whose IDs are given in the primary column 1901, a remote-side port ID column 1904 that stores the identifiers of the remote-side ports of the volumes whose IDs are given in the primary column 1901, an I/O frequency column 1905 that stores the I/O frequencies of the remote-side ports whose IDs are given in the remote-side port ID column 1904, a throughput column 1906 that stores the throughputs of the remote-side ports whose IDs are given in the remote-side port ID column 1904, a side file usage ratio column 1907 that stores the usage ratios of caches that are used for replication of pair states, a data consistency (primary) column 1908 that stores the consistency of data on the primary side, and a data consistency (secondary) column 1909 that stores the consistency of data on the secondary side.

It is possible for the application administrator to prevent a situation where a problem has occurred to replication from occurring by making a repair of the faulty link of the pair "002-003" that the applications "APP1" and "APP3" also use and changing the allocated port for remote copy connection of the pair "011-012" relating to the application "APP2" with reference to the information in the influence range display table 19 displayed on the application management terminal 5. Also, in this case, replication in the pair "002-003" has ended in failure, so information showing that there is a problem in the state of the primary volume of the pair "003-004" that is cascaded with the pair "002-003" is stored in the influence range display table 19. However, as to the pair "004-005", its pair state is set to "SMPL", so it is judged that no influence has been exerted on this pair and no information is stored into the influence range display table 19.

Details of Processing

Next, the details of processing performed in the application management terminal 5, the application servers 2 to 4, and the management server 1 will be described below.

Figure 11:
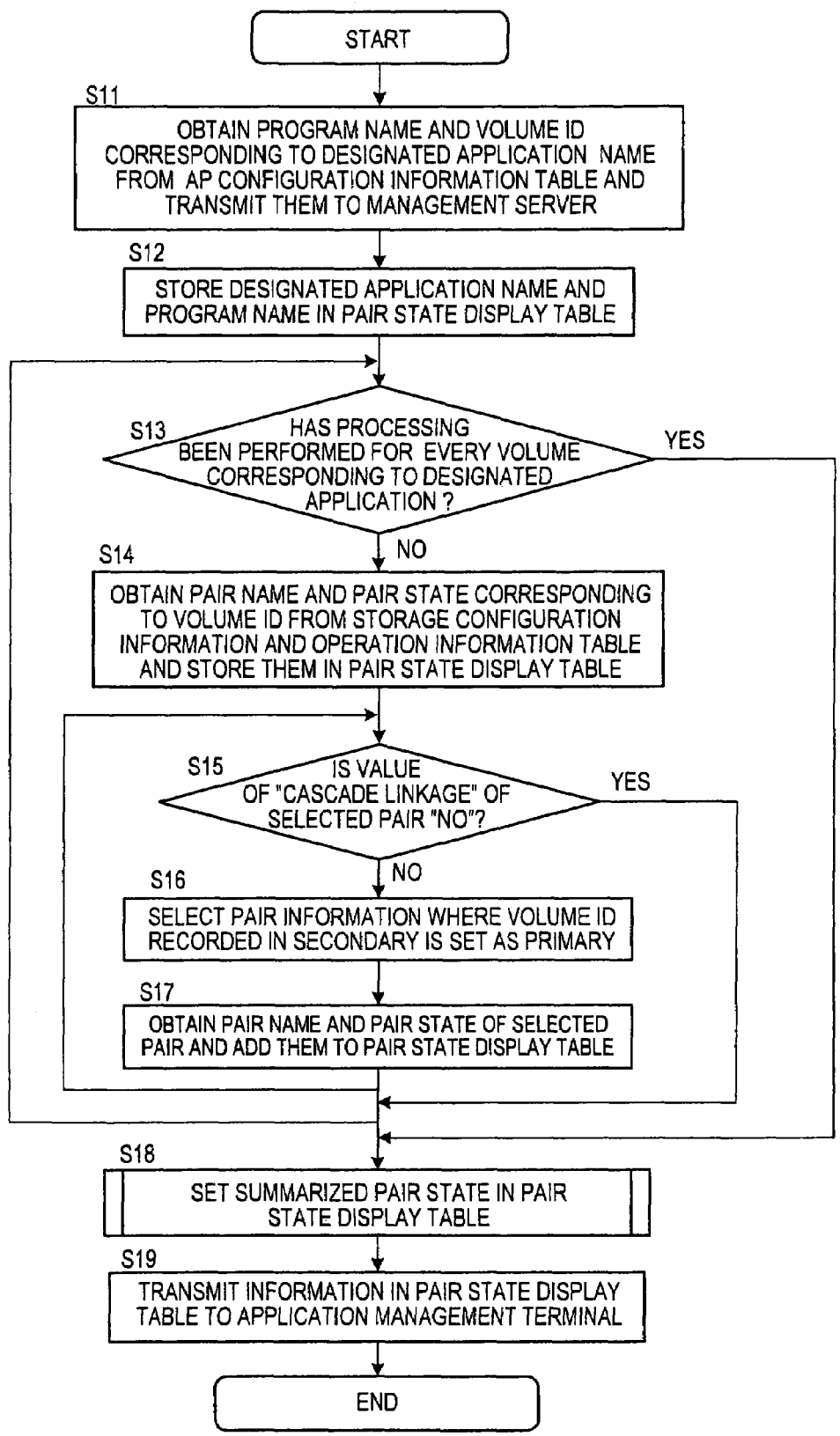
FIG. 11 is a flowchart showing an example of pair state monitoring processing.

First, FIG. 11 is a flowchart showing an example of processing performed by the application management programs 25 to 45 of the application servers 2 to 4 and the storage management program 15 of the management server 1.

A step S11 is processing performed by the application management programs 25 to 45 of the application servers 2 to 4, and steps S12 to S19 are processing performed by the storage management program 15 of the management server 1.

First, as indicated by the arrows S1 and S2 in FIG. 2 described above, the monitoring program 55 of the application management terminal 5 receives the input of an application name by the application administrator or the like, obtains each program name and a server name corresponding to the application name from the application configuration information table 550 shown in FIG. 4, and transmits the obtained program name to an application server, which executes each program having the program name, as a monitoring target.

Next, in the step S11, the application management program of the application server that received the program name from the monitoring program 55 of the application management terminal 5 obtains the volume ID of each volume that the program having the received program name uses by referring to the configuration information table, and transmits the application name, the program name, and the volume ID to the management server 1.

In the step S12, the storage management program 15 stores the application name and the program name received from the application server in the application name column 561 and the program name column 562 of the pair state display table 17 shown in FIG. 6, respectively.

Then, in the step S13, the storage management program 15 judges whether operations in the steps S14 to S17 have been performed for every volume that the application having the designated application name uses. When a result of this judgment is negative, the processing proceeds to the step S14. On the other hand, when the judgment result is positive, the processing proceeds to the step S18.

In the step S14, the storage management program 15 obtains a secondary volume by searching the configuration information and operation information table 16 shown in FIG. 5 using the received volume ID as a key, determines a pair name from the volume IDs in the primary column 1611 and the secondary column 1612, obtains the connection state between the primary volume and the secondary volume from the connection state column 1615, and stores the pair name and the connection state in the pair name column 563 and the connection state column 564 of the pair state display table 17, respectively.

Next, in the step S15, the storage management program 15 judges the presence or absence of a cascade configuration corresponding to the pair volume with reference to the presence or absence of information in the remote-side port ID column 1614 of the configuration information and operation information table 16 in FIG. 5. When a port ID is stored in the remote-side port ID column 1614, the storage management program 15 judges that a cascade configuration exists and the processing proceeds to the step S16. On the other hand, when no port ID is stored in the remote-side port ID column 1614, the storage management program 15 judges that no cascade configuration exists and the processing returns to the step S13.

In the step S16, the storage management program 15 searches the primary column 1611 and selects pair information where the volume ID in the secondary column 1612 is set as a primary volume.

In the step S17, as to the selected pair information, the storage management program 15 determines a pair name, obtains a pair state, and stores them in the pair state display table 17 in the same manner as in the step S14 described above. Following this, the processing returns to the step S15, and the operations in the steps S15 to S17 are repeated until the end point of the cascade configuration is reached. When the end point of the cascade configuration is reached, the processing returns to the step S13.

When the search of the configuration information and operation information table 16 has been performed for every volume ID corresponding to the program name designated from the application server, the processing proceeds to the step S18 in which the storage management program 15 makes a setting of the connection state (summary) column 565 of the pair state display table 17.

Following this, the storage management program 15 transmits information in the pair state display table 17 to the application management terminal 5 and ends the processing. Then, as described above, the monitoring program 55 of the application management terminal 5 outputs the received pair state display table 17 to the display equipment of the application management terminal 5.

It is possible for the application administrator to immediately know a pair state, for which it is required to take measures, as to the designated application name merely by viewing the connection state (summary) column 565 of the pair state display table 17 at the application management terminal 5. In other words, it is possible for the application administrator to immediately grasp a pair state, for which measures should be taken, by searching for an application name, whose summarized connection state in the connection state (summary) column 565 of the pair state display table 17 is set to ERROR or WARN, and searching for a pair name, whose connection state in the connection state column 564 is set to ERROR or WARN, in the pair name column 563 corresponding to the application name whose summarized connection state is set to ERROR or WARN.

Accordingly, even when replication of data corresponding to one application name is performed many times or replication is performed using a cascade configuration, it becomes possible for the application administrator to immediately grasp a pair state to which an abnormality or a warning situation has occurred, to take measures without delay, and to circumvent a loss of replication or perform recovery from a loss without delay.

Next, with reference to a subroutine shown in FIG. 12, the pair state summarizing process performed in the step S18 in FIG. 11 (described above) will be described in detail.

In a step S20, the storage management program 15 obtains a list of connection states (pair states) of pairs corresponding to the program name in the pair state display table 17.

In a step S21, the storage management program 15 judges whether "ERROR" exists in the obtained connection state list. When a result of this judgment is positive, the processing proceeds to a step S24 in which the storage management program 15 sets "ERROR" in the pair state (summary) column 565 and ends the subroutine.

On the other hand, when the judgment result is negative, the processing proceeds to a step S22 in which the storage management program 15 judges whether "WARN" exists in the connection state list. When a result of this judgment is positive, the processing proceeds to a step S25 in which the storage management program 15 sets "WARN" in the pair state (summary) column 565 and ends the subroutine.

On the other hand, when the judgment result is negative, the processing proceeds to a step S23 in which the storage management program 15 sets a value (COPY, PAIR, SMPL, NORMAL, or the like, for instance) showing that the connection state is normal in the pair state (summary) column 565 and ends the subroutine.

Through the processing described above, the summarized connection state column 565 of the pair state display table 17 is completed to be transmitted to the application management terminal 5, thereby informing the application administrator of the presence or absence of a pair state abnormality or warning.

Next, with reference to FIG. 13, informing processing that is executed by the monitoring program 55 of the application management terminal 5 when an abnormality has occurred to a pair state will be described.

Figure 12:
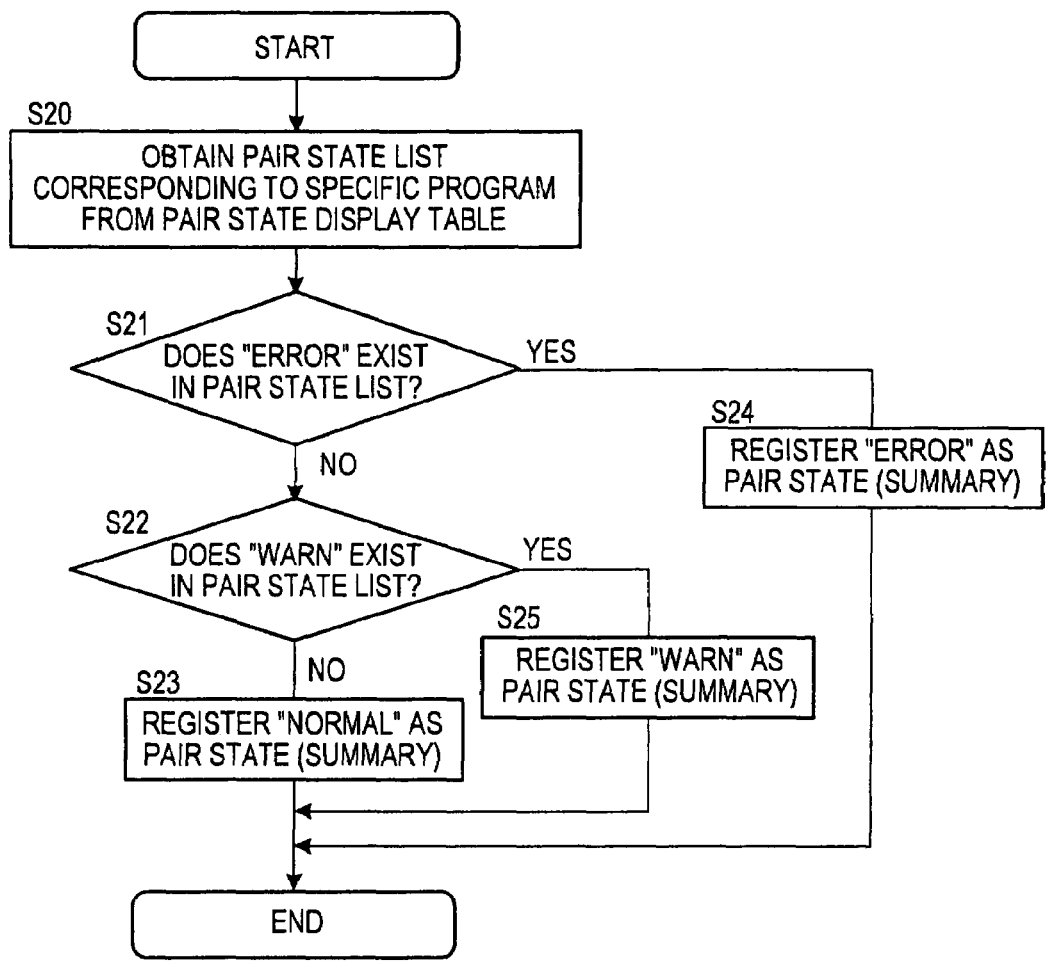
FIG. 12 is a subroutine showing an example of pair state summarizing processing performed in a step S18 in FIG. 11.

A step S30 shows processing that occurs until the processing of the storage management program 15 of the management server 1 shown in FIGS. 11 and 12 (described above) is completed, and the pair state display table 17 is transmitted to the application management terminal 5.

Steps S31 and later show processing of the monitoring program 55 of the application management terminal 5 that received the pair state display table 17 from the management server 1. In the step S31, the monitoring program 55 obtains information in the pair state display table 17.

In a step S32, the monitoring program 55 judges whether a processing end condition has been satisfied. In more detail, the monitoring program 55 judges whether the processing has been performed for every program name in the pair state display table 17. When a result of this judgment is negative, the processing proceeds to a step S33. On the other hand, when the judgment result is positive, the monitoring program 55 ends the processing.

In the step S33, the monitoring program 55 obtains the summarized connection states corresponding to the program names from the connection state (summary) column 565 one at a time, with the summarized connection state corresponding to the first program name in the pair state display table 17 being obtained first. Next, in a step S34, from the informing level column 555 of the application configuration information table 550 shown in FIG. 4, the monitoring program 55 obtains the informing level for e-mail issuance corresponding to the program name.

Then, in a step S35, the monitoring program 55 compares the summarized connection state obtained in the step S33 and the informing level obtained in the step S34 with each other. When the summarized connection state agrees with the informing level or when the summarized connection state is worse than the informing level, the processing proceeds to a step S36 in which the monitoring program 55 obtains a corresponding e-mail destination from the e-mail destination column 556, creates an e-mail containing the program name corresponding to ERROR or WARN, and transmits the created e-mail to the obtained e-mail destination.

On the other hand, when the summarized connection state is better than the informing level, the processing returns to the step S32, and the monitoring program 55 repeatedly performs the operations in the steps S33 to S36 for the next program name.

Figure 13:
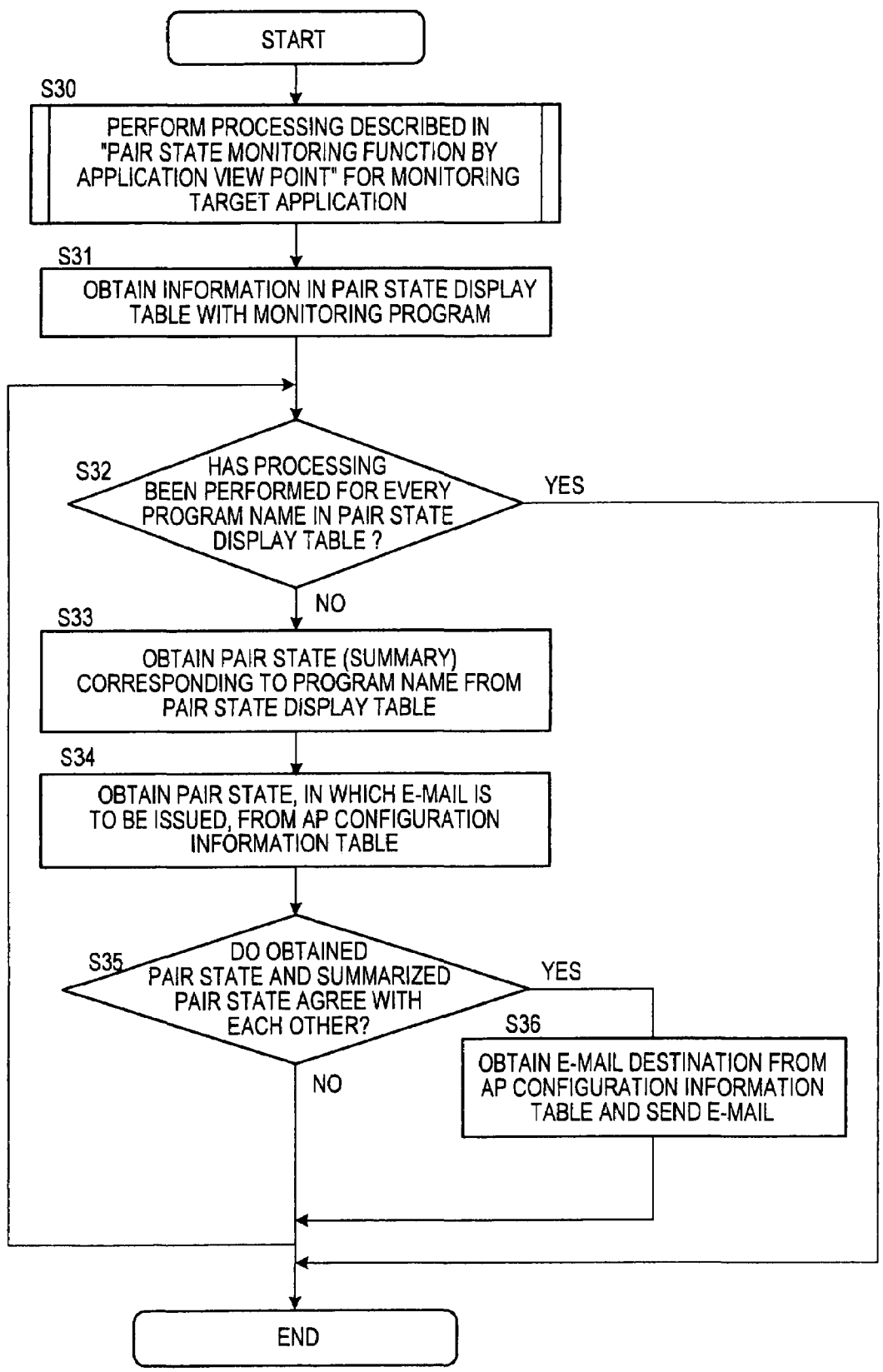
FIG. 13 is a flowchart showing an example of informing processing performed by a monitoring program of an application management terminal.

By repeatedly performing the processing in FIG. 13 for every program name in the received pair state display table 17, when an abnormality or a warning state has occurred to replication of a volume that the application uses, having the application name designated by the application management terminal 5, it is possible to automatically inform the application administrator or the like, as set in advance of the abnormality or the warning state.

For instance, in the pair state display table shown in FIG. 6, ERROR is set for the pair volume "002-003" corresponding to the program name "APP1-1.exe" corresponding to the application name "APP1". Meanwhile, in application configuration information table 550 in FIG. 4, the informing level 555 corresponding to the program name "APP1-1.exe" is set to ERROR. In other words, in the case of "APP1-1.exe", the summarized connection state and the informing level agree with each other. Consequently, the monitoring program 55 transmits the mail described above to "aaa@x.co.jp" that is the e-mail destination set in advance, thereby automatically informing the application administrator or the like of an abnormality or a state where an abnormality may occur.

Figure 14:
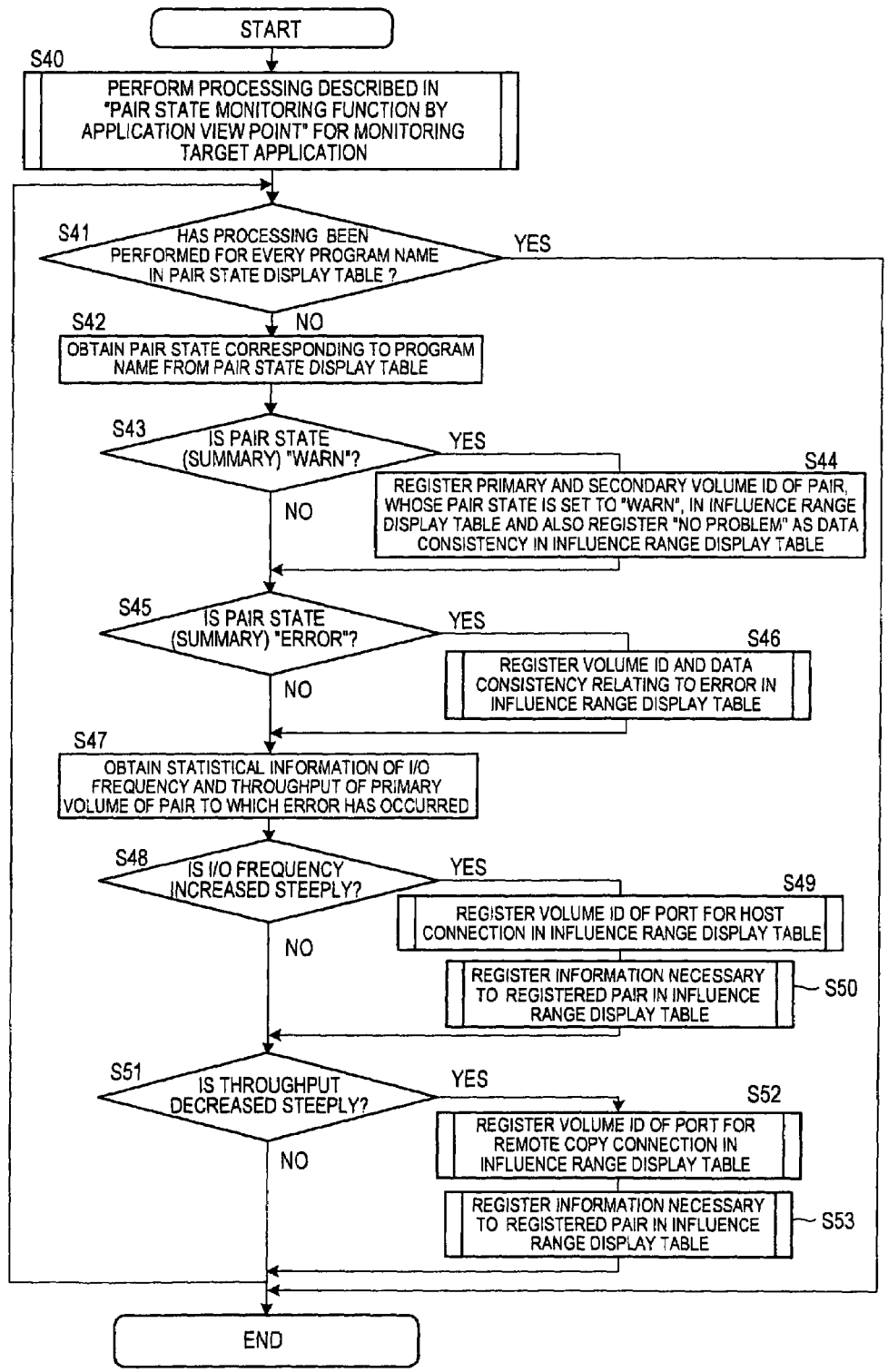
FIG. 14 is a flowchart showing an example of replication relation influence range identifying processing performed by a storage management program of a management server.

Next, with reference to a flowchart shown in FIG. 14, an example of the replication relation influence range identifying processing that is performed by the storage management program 15 of the management server 1 will be described.

A step S40 shows that processing occurs until the processing of the storage management program 15 of the management server 1 shown in FIGS. 11 and 12 described above is completed, and the pair state display table 17 is transmitted to the application management terminal 5. Following this, in steps S41 and later, the replication relation influence range identifying processing is performed.

In the step S41, the storage management program 15 judges whether a processing end condition has been satisfied. In more detail, the storage management program 15 judges whether the processing has been performed for every program name in the pair state display table 17. When a result of this judgment is negative, the processing proceeds to a step S42. On the other hand, when the judgment result is positive, the storage management program 15 ends the processing.

In the step S42, the storage management program 15 obtains the summarized connection states corresponding to the program names from the connection state (summary) column 565 one at a time, with the summarized connection state corresponding to the first program name in the pair state display table 17 being obtained first.

In a step S43, the storage management program 15 judges whether the obtained summarized connection state is "WARN". When a result of this judgment is positive, the processing proceeds to a step S44. On the other hand, when the judgment result is negative, the processing proceeds to a step S45. In the step S44, the storage management program 15 refers to the configuration information and operation information table 16 in FIG. 5 using the volume IDs corresponding to the program name in the pair state display table 17 as a key, obtains volume IDs and subsystem IDs from the primary column 1611 and the secondary column 1612, stores the volume ID and subsystem ID corresponding to a primary volume and the volume ID and subsystem ID corresponding to a secondary volume in the primary column 1801 and the secondary column 1802 of the influence range display table 18 shown in FIG. 7, respectively, and sets "no problem" in the data consistency (primary) column 1808 and the data consistency (secondary) column 1809, thereby showing that no data loss has occurred. Also, the storage management program 15 sets a corresponding application name in the related application name column 1803.

Next, in the step S45, the storage management program 15 judges whether the summarized connection state is "ERROR". When a result of this judgment is positive, the processing proceeds to a step S46. On the other hand, when the judgment result is negative, the processing proceeds to a step S47. In the step S46, the storage management program 15 refers to the configuration information and operation information table 16 in FIG. 5 using the volume IDs corresponding to the program name in the pair state display table 17 as a key, obtains volume IDs and subsystem IDs from the primary column 1611 and the secondary column 1612, stores the volume ID and subsystem ID corresponding to a primary volume and the volume ID and subsystem ID corresponding to a secondary volume in the primary column 1901 and the secondary column 1902 of the influence range display table 19 shown in FIG. 8, respectively, and sets one of "any problem" or "no problem" in the data consistency (primary) column 1908 and the data consistency (secondary) column 1909 according to the presence or absence of a data loss at a replication source or replication destination due to a wire snapping state in a manner to be described later. Also, the storage management program 15 sets a corresponding application name in the related application name column 1903.

In the step S47, the storage management program 15 obtains statistical information of the I/O frequency and the throughput corresponding to the primary volume for which ERROR or WARN has been set. It is sufficient that this statistical information is information with which it is possible to find steep changes of the I/O frequency and the throughput.

In a step S48, the storage management program 15 judges whether the I/O frequency corresponding to the primary volume has increased steeply. When a result of this judgment is positive, the processing proceeds to a step S49. On the other hand, when the judgment result is negative, the processing proceeds to a step S51.

In the step S49, the storage management program 15 obtains the volume ID of each volume connected to the host-side port of the volume corresponding to the current program name from the configuration information and operation information table 16 in FIG. 5, and sets the obtained volume ID in the influence range display table 18. Next, in a step S50, the storage management program 15 sets information that is necessary to each pair state corresponding to the current program name in the influence range display table 18.

In the step S51, the storage management program 15 judges whether the throughput corresponding to the primary volume has decreased steeply. When a result of this judgment is positive, the processing proceeds to a step S52. On the other hand, when the judgment result is negative, the processing returns to the step S41.

In the step S52, the storage management program 15 obtains the volume ID of each volume connected to the remote-side port of the volume corresponding to the current program name from the configuration information and operation information table 16 in FIG. 5, and sets the obtained volume ID in the influence range display table 19. Next, in a step S53, the storage management program 15 sets information that is necessary to each pair state corresponding to the current program name in the influence range display table 19. Then, the processing returns to the step S41 and the storage management program 15 repeats the operations in the steps S41 to S53 described above until the processing have been performed for every program name. In this manner, the influence range display tables 18 and 19 are created. With the influence range display tables 18 and 19, it becomes possible for the application administrator to grasp each pair volume influenced by excessive I/O or wire snapping in a replication relation with ease and without delay.

Figure 15:
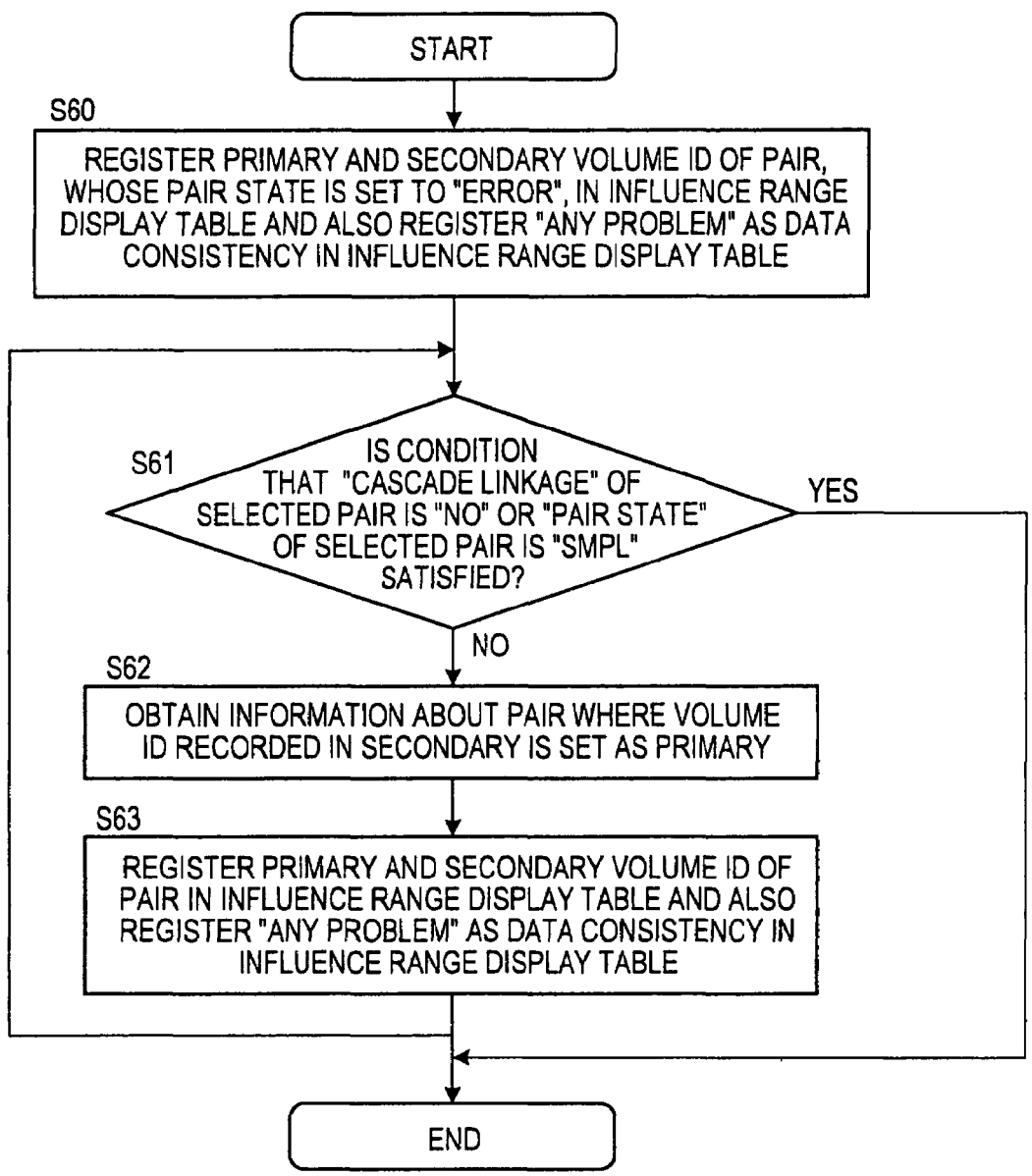
FIG. 15 is a subroutine showing an example of processing that is performed in a step S46 in FIG. 14 and that registers data consistency in the influence range display table.

Next, with reference to a subroutine shown in FIG. 15, an example will be described of processing that is performed in the step S46 in FIG. 14 (described above), for registering data consistency in the influence range display table 19.

In a step S60, the storage management program 15 refers to the pair state display table 17 in FIG. 6 to find volume IDs in the pair name column 563, for which "ERROR" is set in the connection state column 564, and the storage management program 15 sets "any problem" in the data consistency (primary) column 1908 and the data consistency (secondary) column 1909 of the influence range display table 19 in FIG. 8 for the found volume IDs.

Next, in a step S61, the storage management program 15 refers to the configuration information and operation information table 16 in FIG. 5 and, when there exists no volume cascade configuration corresponding to the current program name or when the pair state corresponding to the current program name is SMPL, the subroutine ends. On the other hand, when there exists a cascade configuration, the processing proceeds to a step S62 in which the storage management program 15 obtains from the configuration information and operation information table 16 in FIG. 5, a pair state where the secondary volume of the current pair state is set as a primary volume.

Then, in a step S63, the storage management program 15 registers the primary volume ID and the secondary volume ID of the pair state obtained in the step S62 described above in the primary column 1901 and the secondary column 1902 of the influence range display table 19 and also registers "any problem" in the data consistency columns 1908 and 1909 of the table 19. Then, the processing returns to the step S61 described above, and the operations in the steps S61 to S63 are repeated until the end point of the cascade configuration is reached.

Through the processing described above, "any problem" is set in the data consistency columns for each pair volume cascaded with a pair volume, for which ERROR is set in the connection state column, because there is a high possibility that a data loss may exist in the cascaded pair volume.

Figure 16:
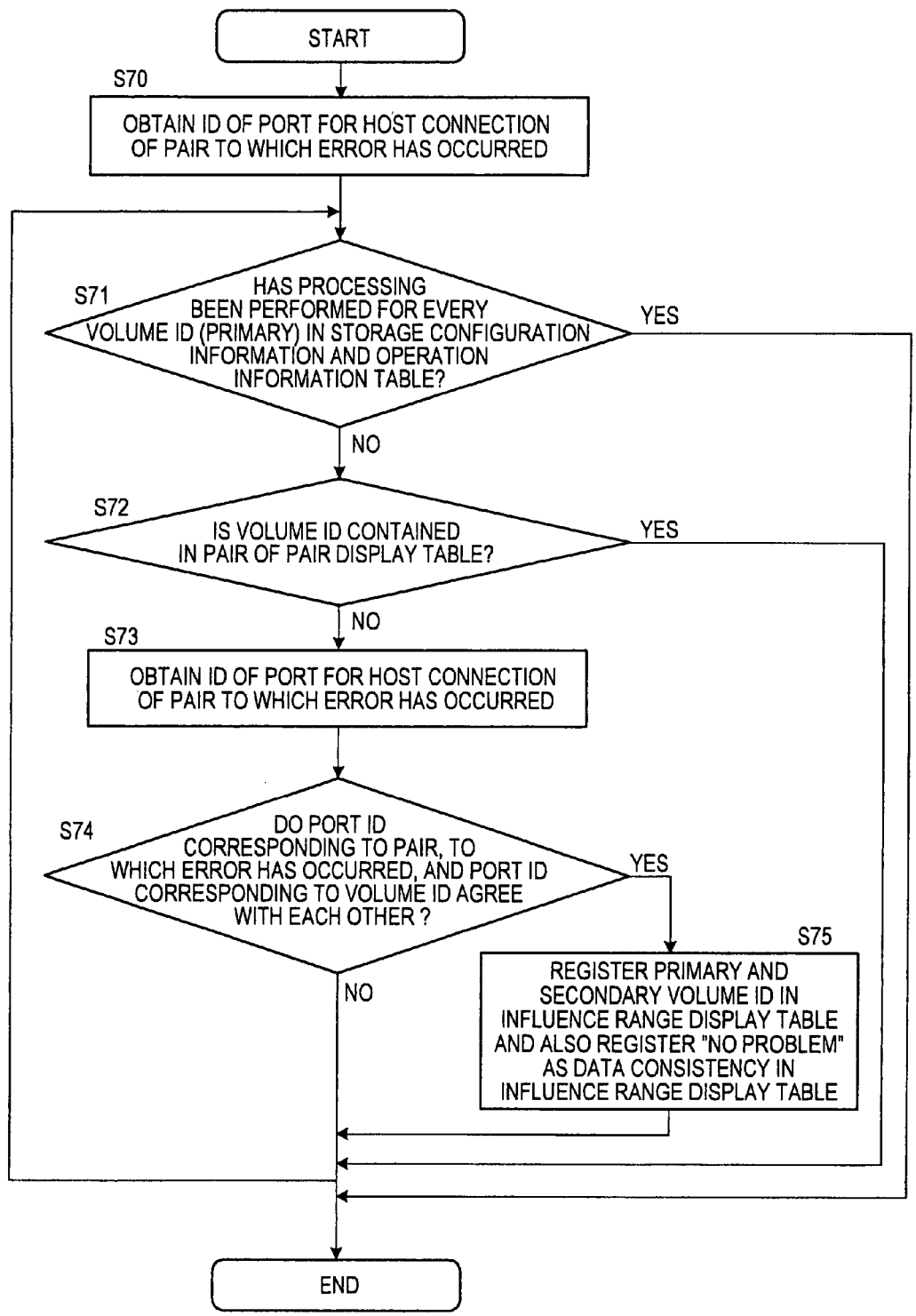
FIG. 16 is a subroutine showing an example of processing that is performed in a step S49 in FIG. 14 for registering the IDs of volumes connected to host-side ports in the influence range display table.

Next, with reference to a subroutine shown in FIG. 16, an example will be described of processing that is performed in the step S49 in FIG. 14 (described above) for registering the volume ID of each volume connected to the host-side port of a pair volume, to which a problem has occurred, in the influence range display table 18.

In a step S70, the storage management program 15 obtains the port ID of the host-side port of a pair volume, to which ERROR (or WARN) has occurred, by referring to the configuration information and operation information table 16 in FIG. 5.

Then, in a step S71, the storage management program 15 judges whether a subroutine end condition has been satisfied. In more detail, the storage management program 15 judges whether the processing has been performed for every primary volume ID in the configuration information and operation information table 16. When a result of this judgment is positive, the storage management program 15 ends this subroutine. On the other hand, when the judgment result is negative, the processing proceeds to a step S72.

In the step S72, the storage management program 15 judges whether the volume ID of a current primary volume is contained in the pair name column 563 of the pair state display table 17, with the first primary volume in the configuration information and operation information table 16 being set as the current primary volume first. When a result of this judgment is positive, the processing returns to the step S71 and the next volume ID is set as a new check target. On the other hand, when the judgment result is negative, the processing proceeds to a step S73.

In the step S73, the storage management program 15 obtains the port ID of the host-side port corresponding to the volume ID of the current primary volume from the configuration information and operation information table 16. Next, in a step S74, the storage management program 15 judges whether the obtained port ID agrees with the port ID corresponding to the pair volume to which ERROR has occurred. When a result of this judgment is positive, the processing proceeds to a step S75 in which the storage management program 15 registers the primary volume ID and its corresponding secondary volume ID in the primary and secondary columns 1801 and 1802 of the influence range display table 18, and also registers "no problem" in the data consistency columns 1808 and 1809 of the table 18.

Following this, the processing returns to the step S71, and the port ID comparison is performed for every primary volume ID.

Through the processing described above, pair volumes corresponding to the port ID of the host-side port, to which a volume where ERROR or WARN has occurred is connected, are registered in succession in the influence range display table 18.

Figure 17:
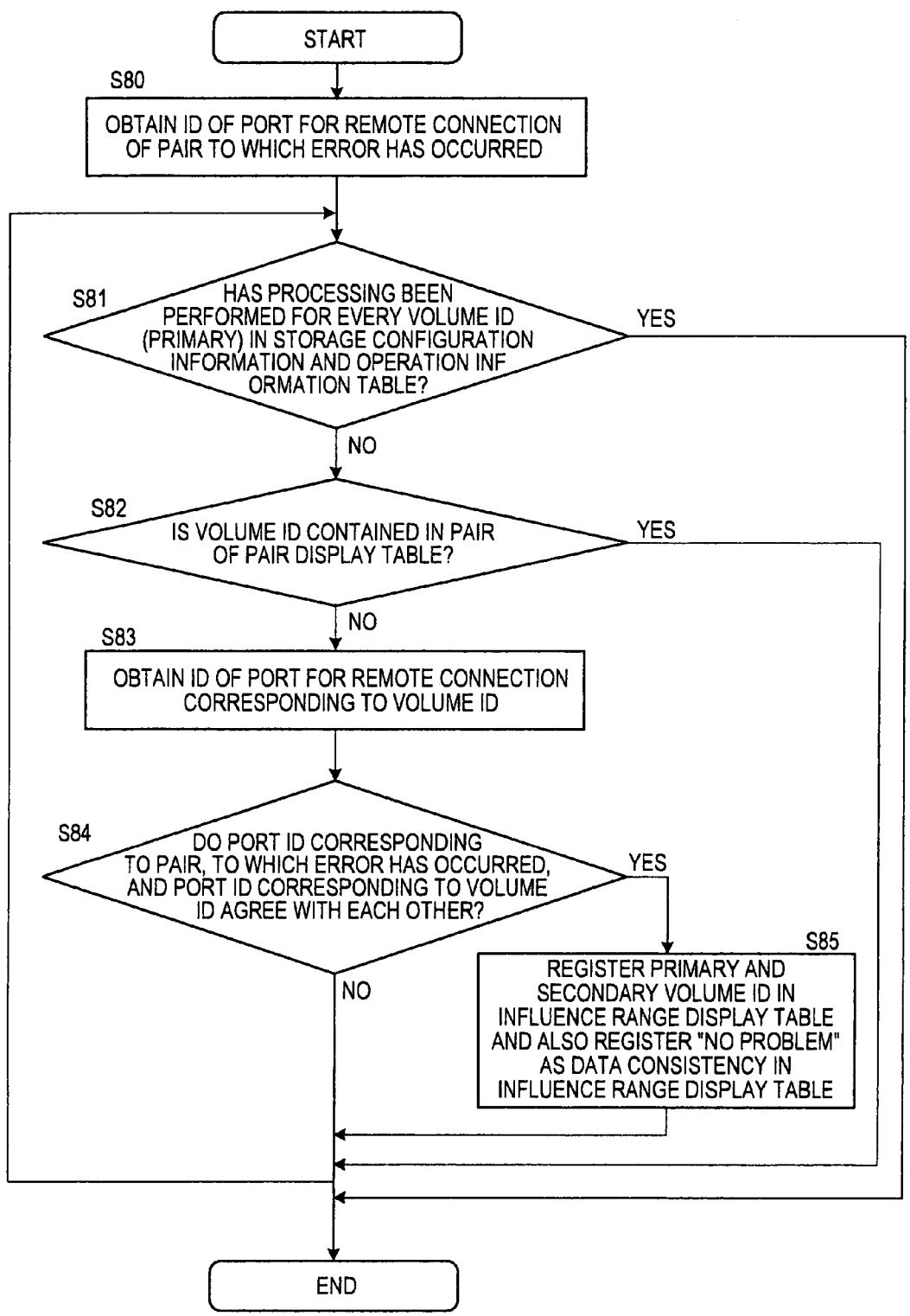
FIG. 17 is a subroutine showing an example of processing that is performed in a step S52 in FIG. 14 for registering the IDs of volumes connected to remote-side ports in the influence range display table.

Next, with reference to a subroutine shown in FIG. 17, an example will be described of processing that is performed in the step S52 in FIG. 14 (described above) for registering the volume ID of each volume connected to the remote-side port of a pair volume, to which a problem has occurred, in the influence range display table 19.

In a step S80, by referring to the configuration information and operation information table 16 in FIG. 5, the storage management program 15 obtains the port ID of the remote-side port of a pair volume, to which ERROR (or WARN) has occurred.

Next, in a step S81, the storage management program 15 judges whether a subroutine end condition has been satisfied. In more detail, the storage management program 15 judges whether the processing has been performed for every primary volume ID in the configuration information and operation information table 16. When a result of this judgment is positive, the storage management program 15 ends the subroutine. On the other hand, when the judgment result is negative, the processing proceeds to a step S82.

In the step S82, the storage management program 15 judges whether the volume ID of a current primary volume is contained in the pair name column 563 of the pair state display table 17, with the first primary volume in the configuration information and operation information table 16 being set as the current primary volume first. When a result of this judgment is positive, the processing returns to the step S81 and the next volume ID is set as a new check target. On the other hand, when the judgment result is negative, the processing proceeds to a step S83.

In the step S83, the storage management program 15 obtains the port ID of the remote-side port corresponding to the volume ID of the current primary volume from the configuration information and operation information table 16. Next, in a step S84, the storage management program 15 judges whether the obtained port ID agrees with the port ID corresponding to the pair volume to which ERROR has occurred. When a result of this judgment is positive, the processing proceeds to a step S85 in which the storage management program 15 registers the primary volume ID and its corresponding secondary volume ID in the primary and secondary columns 1901 and 1902 of the influence range display table 19, and also registers "no problem" in the data consistency columns 1908 and 1909 of the table 19.

Following this, the processing returns to the step S81 and the port ID comparison is performed for every primary volume ID.

Through the processing described above, pair volumes corresponding to the port ID of the remote-side port, to which a volume where ERROR or WARN has occurred is connected, are registered in succession in the influence range display table 19.

Next, with reference to a subroutine shown in FIG. 18, an example will be described of processing that is performed in the step S50 in FIG. 14 (described above) for registering information that is necessary to registered pair states in the influence range display table 18 concerning the host-side ports.

In a step S90, the storage management program 15 judges whether a subroutine end condition has been satisfied. In more detail, the storage management program 15 judges whether the processing has been performed for every primary volume ID in the influence range display table 18. When a result of this judgment is positive, the storage management program 15 ends the subroutine. On the other hand, when the judgment result is negative, the processing proceeds to a step S91.

In the step S91, the storage management program 15 judges whether a current volume ID is contained in the pair state display table 17, with the first primary volume ID in the influence range display table 18 being set as the current volume ID first. When a result of this judgment is positive, the processing proceeds to a step S93. On the other hand, when the judgment result is negative, the processing proceeds to a step S92.

In the step S92, the current volume ID is not contained in the pair state display table 17, so the storage management program 15 informs the application management programs 25, 35, and 45 of the volume ID and obtains the application name corresponding to the volume ID. On the other hand, in the step S93, the storage management program 15 obtains the application name corresponding to the volume ID from the pair state display table 17.

Next, in a step S94, the storage management program 15 registers the obtained application name in the related application name column 1803 of the influence range display table 18 at a location corresponding to the volume ID.

Then, in a step S95, the storage management program 15 obtains the port ID of the host-side port corresponding to the volume ID from the configuration information and operation information table 16, and registers the obtained port ID in the host-side port ID column 1804 of the influence range display table 18.

Next, in a step S96, the storage management program 15 obtains an I/O frequency corresponding to the volume ID from the configuration information and operation information table 16 and registers the obtained I/O frequency in the I/O frequency column 1805 of the influence range display table 18. Following this, in a step S97, the storage management program 15 obtains a throughput corresponding to the volume ID from the configuration information and operation information table 16 and registers the obtained throughput in the throughput column 1806 of the influence range display table 18. Then, in a step S98, the storage management program 15 obtains a side file usage ratio corresponding to the volume ID from the configuration information and operation information table 16, and registers the obtained side file usage ratio in the side file usage ratio column 1807 of the influence range display table 18.

By performing the operations in the steps S90 to S98 described above for every primary volume ID in the influence range display table 18, the influence range display table 18 is generated.

Figure 19:
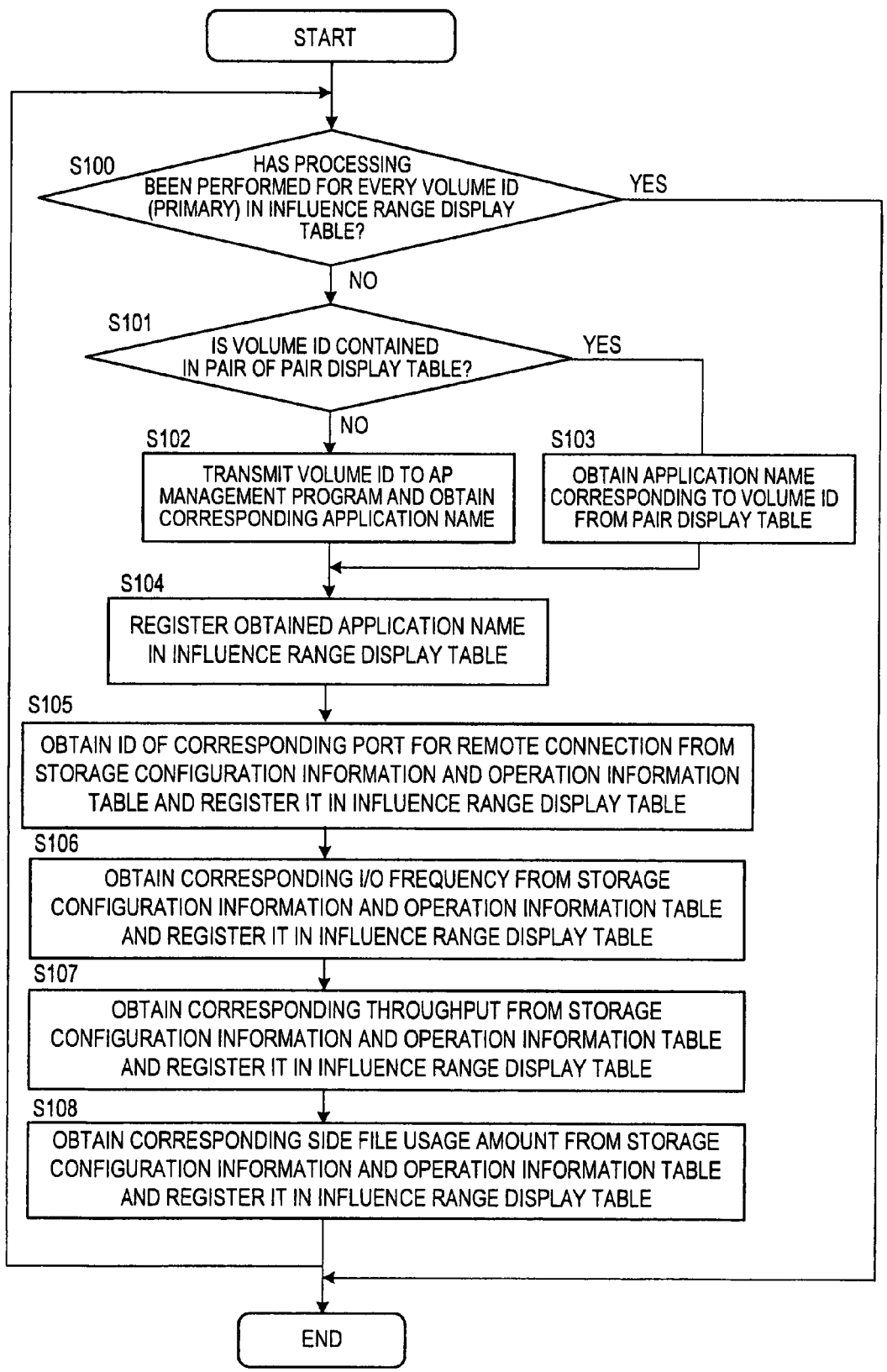
FIG. 19 is a subroutine showing an example of processing that is performed in a step S53 in FIG. 14 for registering information necessary to registered pair states in an influence range display table concerning the remote-side ports.

Next, with reference to a subroutine shown in FIG. 19, an example will be described of processing that is performed in the step S53 in FIG. 14 (described above) for registering information that is necessary to registered pair states in the influence range display table 19 concerning the remote-side ports.

Figure 18:
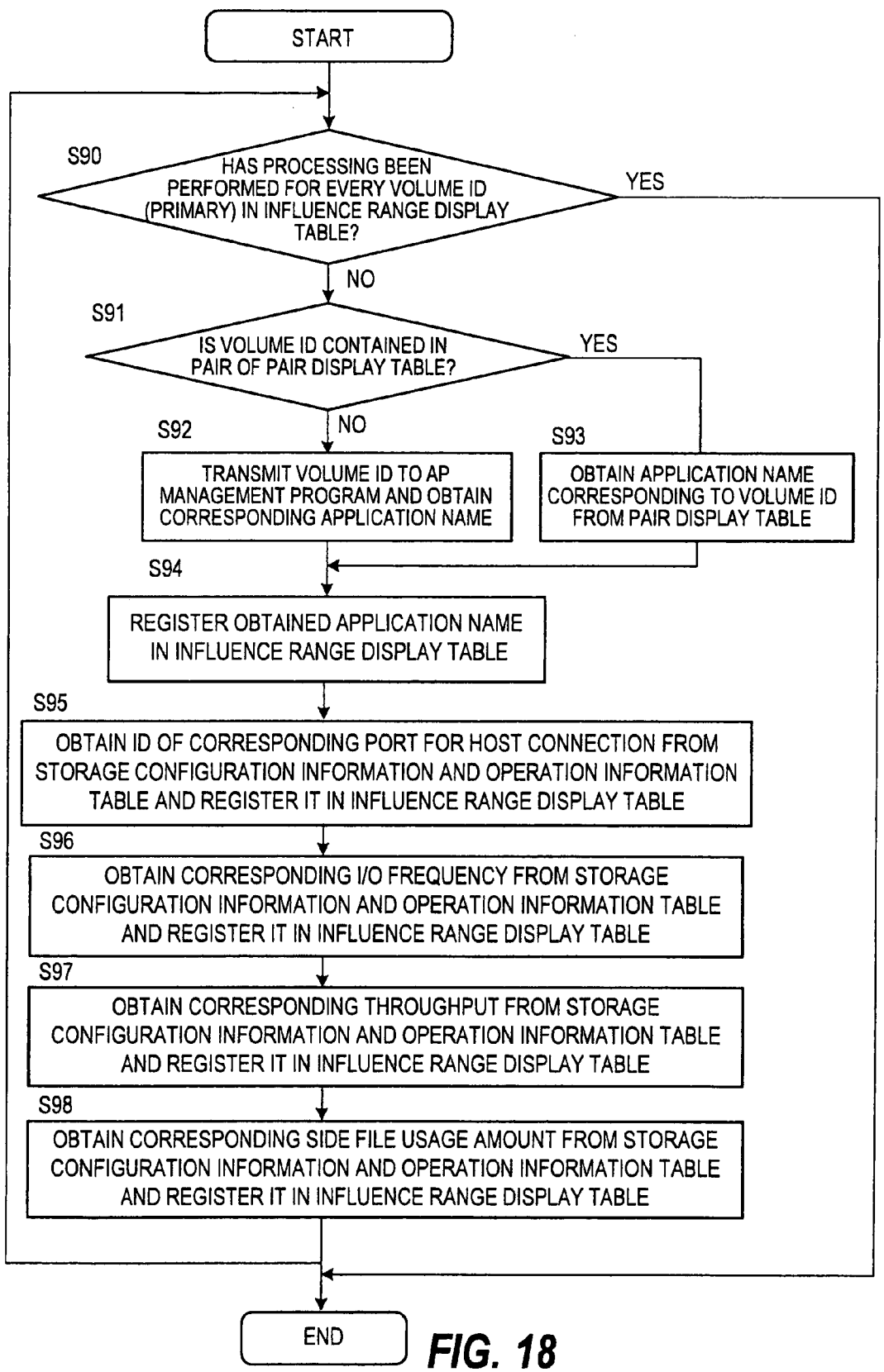
FIG. 18 is a subroutine showing an example of processing that is performed in a step S50 in FIG. 14 for registering information necessary to registered pair states in an influence range display table concerning the host-side ports.

Like the steps S90 to S98 in FIG. 18 described above, steps S100 to S108 in FIG. 19 are repeatedly executed for every primary volume ID in the influence range display table 19. Also, in the case of FIG. 18, the host-side port ID, I/O frequency, throughput, and side file usage ratio corresponding to the primary volume ID are obtained and are registered in the influence range display table 18 in the steps S95 and later. In contrast to this, in the case of FIG. 19, the remote-side port ID, I/O frequency, throughput, and side file usage ratio corresponding to the primary volume ID are obtained and are registered in the influence range display table 19 in the steps S105 and later. In other steps, the same operations as in the case of FIG. 18 are performed.

By performing the operations in the steps S100 to S108 for every primary volume ID in the influence range display table 19, the influence range display table 19 is generated.

As a result of the replication relation influence range identifying described above, when an abnormality has occurred to the state of a pair volume relating to an application that is a monitoring target, or when an abnormality may occur to the state of the pair volume (when warning has occurred thereto), a range where it is necessary to take measures and a range where the problem seems to exert influences are selectively displayed. When doing so, the storage management program 15 obtains operation information relating to the phenomenon that has occurred and narrows down the influence range according to the obtained operation information. Consequently, even when there have occurred phenomena that seem to be the same, the range of the narrowing down varies depending on circumstances at that time. Therefore, it becomes possible to exhibit an appropriate influence range to the application administrator.

As described above, according to this invention, it becomes possible to monitor each volume that a specific application uses and the pair state (replication relation) of each volume cascaded or paired therefrom, and to monitor whether a problem has occurred to replication of data.

After obtaining each program name and each volume ID corresponding to a specific application name from the application configuration information table 550 shown in FIG. 4, the application management terminal 5 transmits them to the management server 1. The management server 1 obtains the pair state corresponding to the volume ID from the configuration information and operation information table shown in FIG. 5, and stores the obtained information in the pair state display table. At this time, the management server 1 also obtains the pair state of each cascaded volume from the configuration information and operation information table, and stores it in the pair state display table. Finally, the management server 1 adds information where the pair states have been summarized to the pair state display table and then provides this table to the application management terminal 5 that the application administrator uses. With the summarized information in the table, it becomes possible for the application administrator to confirm whether an abnormality has occurred to data that he/she manages and each pair state at a replication destination of the data at a glance.

It should be noted that in the embodiment described above, the tracing of pair volumes (replication relation) that an application uses and the detection of a fault are performed by the storage management program 15 of the management server 1 and the monitoring program 55 of the application management terminal 5, although the storage management program 15 and the monitoring program 55 may be executed in the same computer.

Also, in the embodiment described above, the application configuration information table 550 is provided in the application management terminal 5, although this table 550 may be provided in each of the application servers 2 to 4, and may be inquired from the application management terminal 5.

While the present invention has been described in detail and pictorially in the accompanying drawings, the present invention is not limited to such detail but covers various obvious modifications and equivalent arrangements, which fall within the purview of the appended claims.

What is claimed is:

1. A method for managing a storage system comprising an application server that provides an application, a first volume that stores data of the application, and a plurality of second volumes set in pair states where replicas of the first volume are stored, the method comprising the steps of:

obtaining the second volumes set in the pair states with the first volume as a starting point; and summarizing information relating to an activity of the pairs of the second volumes based on a result of the obtaining, the information including at least a performance information of at least one of replication and usage of resources shared by the pairs, wherein the storage system comprises a plurality of application servers and the application is composed of a plurality of programs that are executed by the plurality of application servers, wherein the step of obtaining the second volumes comprises:

identifying the application;

identifying a first volume storing data for each program of the identified application; and obtaining every second volume set in a pair state with the first volume, wherein the step of summarizing the attribute information comprises:

summarizing the first volume and the second volume for each program of the identified application.

2. A method for managing a storage system comprising an application server that provides an application, a first volume that stores data of the application, and a plurality of second volumes set in pair states where replicas of the first volume are stored, the method comprising the steps of:

obtaining the second volumes set in the pair states with the first volume as a starting point; and summarizing performance information relating to an activity of the pairs of the second volumes based on a result of the obtaining, wherein the storage system comprises a plurality of application servers and the application is composed of a plurality of programs that are executed by the plurality of application servers, wherein the step of obtaining the second volumes comprises:

identifying the application;

identifying a first volume storing data for each program of the identified application;

obtaining every second volume set in a pair state with the first volume; and obtaining at least one of application servers using the first volume and the second volumes, wherein the step of summarizing performance information comprises:

summarizing the first volume and the second volume for each program of the identified application.

* * * * *